US011012981B2

(12) United States Patent
Lee et al.

(10) Patent No.: US 11,012,981 B2
(45) Date of Patent: May 18, 2021

(54) FLEXIBLE MONITORING PERIODICITY FOR SLOT FORMAT INDICATOR

(71) Applicant: QUALCOMM Incorporated, San Diego, CA (US)

(72) Inventors: Heechoon Lee, San Diego, CA (US); Peter Gaal, San Diego, CA (US); Wanshi Chen, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 16/143,381

(22) Filed: Sep. 26, 2018

(65) Prior Publication Data

US 2019/0104510 A1 Apr. 4, 2019

Related U.S. Application Data

(60) Provisional application No. 62/566,739, filed on Oct. 2, 2017.

(51) Int. Cl.
*H04W 4/00* (2018.01)
*H04W 72/04* (2009.01)
(Continued)

(52) U.S. Cl.
CPC ....... *H04W 72/0406* (2013.01); *H04L 5/0094* (2013.01); *H04W 72/12* (2013.01)

(58) Field of Classification Search
None
See application file for complete search history.

(56) References Cited

U.S. PATENT DOCUMENTS

2019/0245648 A1* 8/2019 Jo .................... H04L 5/0051
2019/0356524 A1* 11/2019 Yi .................... H04B 7/0695
(Continued)

OTHER PUBLICATIONS

CATT: "Configuration and Monitoring of the group-conmon PDCCH", 3GPP Draft; R1-1710082, 3rd Generation Partnership Project (3GPP), Mobile Competence Centre; 650, Route Des Lucioles; F-06921 Sophia-Antipolis Cedex; France, vol. RAN WG1, No. Qingdao; Jun. 27, 2017-Jun. 30, 2017 Jun. 26, 2017 XP051299306, Retrieved from the Internet: URL:http://www.3gpp.org/ftp/Meetings_3GPP_SYNC/RAN1/Docs/ [retrieved on Jun. 26, 2017], 5 pages.

(Continued)

*Primary Examiner* — Phirin Sam
(74) *Attorney, Agent, or Firm* — Linda G. Gunderson; Holland & Hart LLP

(57) ABSTRACT

Methods, systems, and devices for wireless communications are described. A wireless device may identify a default monitoring periodicity for monitoring a control channel for a slot format indicator (SFI). For example, the default monitoring periodicity may be based on semi-static control signaling received from a base station or another suitable network entity. The wireless device may subsequently receive an indication of a dynamic monitoring periodicity for monitoring the control channel for the SFI. In some cases, the dynamic monitoring periodicity indication may be included in the SFI. The wireless device may then monitor the control channel for the SFI based at least in part on the dynamic monitoring periodicity.

54 Claims, 18 Drawing Sheets

(51) Int. Cl.
*H04W 72/12* (2009.01)
*H04L 5/00* (2006.01)

(56) References Cited

U.S. PATENT DOCUMENTS

2020/0221481 A1* 7/2020 Park .................. H04W 4/80
2020/0274687 A1* 8/2020 Kim .................. H04L 5/1469

OTHER PUBLICATIONS

CATT: "Contents of the Group-common PDCCH", 3GPP Draft; R1-1710081, 3rd Generation Partnership Project (3GPP), Mobile Competence Centre; 650, Route Des Lucioles; F-06921 Sophia-Antipolis Cedex; France, vol. RAN WG1, No. Qingdao; Jun. 27, 2017-Jun. 30, 2017 Jun. 26, 2017, XP051299305, Retrieved from the Internet: URL:http://www.3gpp.org/ftp/Meetings_3GPP_SYNC/RAN1/Docs/ [retrieved on Jun. 26, 2017], 4 pages.

International Search Report and Written Opinion—PCT/US2018/053149—ISA/EPO—dated Jan. 9, 2019.

QUALCOMM Incorporated: "Remaining Issues for Slot Format Indication", 3GPP Draft; R1-1802835_Remaining Issues on SFI, 3rd Generation Partnership Project (3GPP), Mobile Competence Centre; 650, Route Des Lucioles; F-06921 Sophia-Antipolis Cedex; France, vol. RAN WG1, No. Athens, Greece; Jan. 26, 2018-Mar. 2, 2018 Feb. 17, 2018, XP051398248, Retrieved from the Internet: URL:http://www.3gpp.org/ftpjtsg%5Fran/WG1%5FRL1/TSGR1%5F92/Docs/ [retrieved on Feb. 17, 2018], 12 pages.

CATT: "[89-20] email discussion: Group-common PDCCH for NR," 3GPP Draft; R1-1710968, 3rd Generation Partnership Project (3GPP), Mobile Competence Centre; 650, Route Des Lucioles; F-06921 Sophia-Antipolis Cedex; France, vol. RAN WG1, No. Qingdao; Jun. 27, 2017-Jun. 30, 2017, Jun. 28, 2017, XP051305938, 22 pages, Retrieved from the Internet: URL:http://www.3gpp.org/ftp/tsg_ran/WG1_RL1/TSGR1_AH/NR_AH_1706/Docs/ [retrieved on Jun. 28, 2017].

* cited by examiner

FLEXIBLE MONITORING PERIODICITY FOR SLOT FORMAT INDICATOR

CROSS REFERENCES

The present Application for Patent claims the benefit of U.S. Provisional Patent Application No. 62/566,739 by LEE et al., entitled "Flexible Monitoring Periodicity For Slot Format Indicator," filed Oct. 2, 2017, assigned to the assignee hereof, and expressly incorporated by reference herein.

BACKGROUND

The following relates generally to wireless communication, and more specifically to flexible monitoring periodicity for a slot format indicator.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-s-OFDM). A wireless multiple-access communications system may include a number of base stations or network access nodes, each simultaneously supporting communication for multiple communication devices, which may be otherwise known as user equipment (UE).

Some wireless systems may be limited from a lack of flexibility when allocating communication resources. For example, systems that only use static or semi-static resource allocation schemes may experience decreased performance metrics (e.g., throughput, latency, etc.) in situations in which a communication load for the system or communication quality within the system changes relatively rapidly. Improved resource allocation schemes may be desired.

SUMMARY

The described techniques relate to improved methods, systems, devices, or apparatuses that support a flexible monitoring periodicity for a slot format indicator (SFI). Generally, the described techniques consider a defined monitoring pattern for a control channel, which may be referred to as a group common physical downlink control channel (group common (GC) physical downlink control channel (PDCCH)). The GC PDCCH may carry a SFI, which informs user equipments (UEs) of a transmission format that applies to the symbols of one or more slots. The SFI, for example, may indicate which symbols of a slot are configured as downlink symbols, uplink symbols, gap symbols, and unknown (e.g., or reserved) symbols. In aspects of the present disclosure, the SFI may be transmitted with a periodicity that varies based on one or more system conditions. A UE that is to receive the SFI may identify a set of monitoring occasions based at least in part on the dynamic periodicity. This dynamic periodicity may differ in some aspects from a default monitoring periodicity that is signaled to the UE or otherwise configured. The UE may switch between the default and dynamic monitoring periodicities. Such techniques (e.g., along with additional considerations outlined below) may improve system performance (e.g., may increase a battery life of a UE, may improve system throughput, may reduce communication latency, may reduce signaling overhead associated with dynamically scheduled resources, etc.).

A method of wireless communication is described. The method may include identifying a default monitoring periodicity for monitoring a control channel for a SFI, identify a dynamic monitoring periodicity for monitoring the control channel for the SFI based at least in part on a received SFI, and monitoring the control channel for the SFI based at least in part on the dynamic monitoring periodicity.

An apparatus for wireless communication is described. The apparatus may include means for identifying a default monitoring periodicity for monitoring a control channel for a SFI, means for identifying a dynamic monitoring periodicity for monitoring the control channel for the SFI, and means for monitoring the control channel for the SFI based at least in part on the dynamic monitoring periodicity.

Another apparatus for wireless communication is described. The apparatus may include a processor, memory in electronic communication with the processor, and instructions stored in the memory. The instructions may be operable to cause the processor to identify a default monitoring periodicity for monitoring a control channel for a SFI, identifying a dynamic monitoring periodicity for monitoring the control channel for the SFI based at least in part on a received SFI, and monitor the control channel for the SFI based at least in part on the dynamic monitoring periodicity.

A non-transitory computer-readable medium for wireless communication is described. The non-transitory computer-readable medium may include instructions operable to cause a processor to identify a default monitoring periodicity for monitoring a control channel for a SFI, identify a dynamic monitoring periodicity for monitoring the control channel for the SFI based at least in part on a received SFI, and monitor the control channel for the SFI based at least in part on the dynamic monitoring periodicity.

Some examples of the method, apparatus, and non-transitory computer-readable medium described herein may further include processes, features, means, or instructions for decoding, during a first monitoring occasion, the SFI associated with a first set of slots based at least in part on the default monitoring periodicity. Some examples of the method, apparatus, and non-transitory computer-readable medium described herein may further include processes, features, means, or instructions for identifying a second monitoring occasion based at least in part on a number of slots in the first set of slots. Some examples of the method, apparatus, and non-transitory computer-readable medium described herein may further include processes, features, means, or instructions for monitoring, during the second monitoring occasion, the control channel for the SFI associated with a second set of slots.

In some examples of the method, apparatus, and non-transitory computer-readable medium described herein, the second set of slots comprises a next slot following the first set of slots.

In some examples of the method, apparatus, and non-transitory computer-readable medium described herein, the first set of slots, or the second set of slots, or both consist of a single slot.

Some examples of the method, apparatus, and non-transitory computer-readable medium described herein may further include processes, features, means, or instructions for refraining from monitoring the control channel during monitoring occasions not associated with the dynamic monitoring periodicity.

Some examples of the method, apparatus, and non-transitory computer-readable medium described herein may further include processes, features, means, or instructions for cancelling one or more monitoring occasions associated with the default monitoring periodicity.

In some examples of the method, apparatus, and non-transitory computer-readable medium described herein, a device fails to decode the SFI during a monitoring occasion associated with the dynamic monitoring periodicity. Some examples of the method, apparatus, and non-transitory computer-readable medium described herein may further include processes, features, means, or instructions for monitoring the control channel in each slot subsequent to the monitoring occasion until a monitoring occasion associated with the default monitoring periodicity may be reached.

Some examples of the method, apparatus, and non-transitory computer-readable medium described herein may further include processes, features, means, or instructions for identifying a second dynamic monitoring periodicity during the monitoring occasion associated with the default monitoring periodicity. Some examples of the method, apparatus, and non-transitory computer-readable medium described herein may further include processes, features, means, or instructions for monitoring the control channel for the SFI based at least in part on the second dynamic monitoring periodicity.

Some examples of the method, apparatus, and non-transitory computer-readable medium described herein may further include processes, features, means, or instructions for failing to decode the SFI during a monitoring occasion associated with the dynamic monitoring periodicity. Some examples of the method, apparatus, and non-transitory computer-readable medium described herein may further include processes, features, means, or instructions for monitoring the control channel for the SFI based at least in part on the default monitoring periodicity until a second dynamic monitoring periodicity may be received. Some examples of the method, apparatus, and non-transitory computer-readable medium described herein may further include processes, features, means, or instructions for monitoring the control channel for the SFI based at least in part on the second dynamic monitoring periodicity.

Some examples of the method, apparatus, and non-transitory computer-readable medium described herein may further include processes, features, means, or instructions for receiving control signaling that indicates the default monitoring periodicity.

In some examples of the method, apparatus, and non-transitory computer-readable medium described herein, the control signaling comprises cell-specific radio resource control (RRC) signaling or UE-specific RRC signaling.

Some examples of the method, apparatus, and non-transitory computer-readable medium described herein may further include processes, features, means, or instructions for identifying a plurality of monitoring occasions based at least in part on the default monitoring periodicity.

In some examples of the method, apparatus, and non-transitory computer-readable medium described herein, the SFI indicates whether symbols for one or more slots may be configured for uplink communications, downlink communications, or may be reserved.

In some examples of the method, apparatus, and non-transitory computer-readable medium described herein, the dynamic monitoring periodicity may be less than or greater than the default monitoring periodicity.

In some examples of the method, apparatus, and non-transitory computer-readable medium described herein, the dynamic monitoring periodicity may be equal to the default monitoring periodicity and a monitoring occasion for the SFI associated with the dynamic monitoring periodicity may be different from a monitoring occasion for the SFI associated with the default monitoring periodicity.

In some examples of the method, apparatus, and non-transitory computer-readable medium described herein, the control channel comprises a GC PDCCH.

In some examples of the method, apparatus, and non-transitory computer-readable medium described herein, the indication of the dynamic monitoring periodicity may be received in the SFI.

A method of wireless communication is described. The method may include determining a default monitoring periodicity for monitoring a control channel, configuring a SFI that indicates a transmission format for one or more slots, and transmitting an indication of a dynamic monitoring periodicity for monitoring the control channel for the SFI.

An apparatus for wireless communication is described. The apparatus may include means for determining a default monitoring periodicity for monitoring a control channel, means for configuring a SFI that indicates a transmission format for one or more slots, and means for transmitting an indication of a dynamic monitoring periodicity for monitoring the control channel for the SFI.

Another apparatus for wireless communication is described. The apparatus may include a processor, memory in electronic communication with the processor, and instructions stored in the memory. The instructions may be operable to cause the processor to determine a default monitoring periodicity for monitoring a control channel, configure a SFI that indicates a transmission format for one or more slots, and identify a dynamic monitoring periodicity for monitoring the control channel for the SFI.

A non-transitory computer-readable medium for wireless communication is described. The non-transitory computer-readable medium may include instructions operable to cause a processor to determine a default monitoring periodicity for monitoring a control channel, configure a SFI that indicates a transmission format for one or more slots, and identify a dynamic monitoring periodicity for monitoring the control channel for the SFI.

Some examples of the method, apparatus, and non-transitory computer-readable medium described herein may further include processes, features, means, or instructions for transmitting, based at least in part on the determining, control signaling indicating the default monitoring periodicity for monitoring the control channel, the control signaling which may be at least one of cell-specific RRC signaling or UE-specific RRC signaling.

In some examples of the method, apparatus, and non-transitory computer-readable medium described herein, the SFI indicates whether symbols for the one or more slots may be configured for uplink communications, downlink communications, or may be reserved.

In some examples of the method, apparatus, and non-transitory computer-readable medium described herein, the dynamic monitoring periodicity may be less than or greater than the default monitoring periodicity.

In some examples of the method, apparatus, and non-transitory computer-readable medium described above, the dynamic monitoring periodicity may be equal to the default monitoring periodicity and a monitoring occasion for the SFI associated with the dynamic monitoring periodicity may be different from a monitoring occasion for the SFI associated with the default monitoring periodicity.

In some examples of the method, apparatus, and non-transitory computer-readable medium described herein, the control channel comprises a GC PDCCH.

In some examples of the method, apparatus, and non-transitory computer-readable medium described herein, the indication of the dynamic monitoring periodicity may be transmitted in the SFI.

DETAILED DESCRIPTION

Some wireless communications systems may support a control channel (e.g., a group common (GC) physical downlink control channel (PDCCH)) carrying a slot format indicator (SFI), which indicates a transmission format for one or more slots (e.g., where the transmission format identifies symbols that are to be used for downlink transmissions, uplink transmissions, gaps, or are reserved). In some cases, the number of slots whose format is controlled by a given SFI may vary. For example, in some cases the SFI may indicate the format of a single slot; in other cases, the SFI may indicate the format of multiple slots. Because of the dynamic nature of the SFI, a UE that is configured to monitor the GC PDCCH may benefit from employing a dynamic monitoring periodicity for the GC PDCCH. That is, rather than using resources to monitor for a format of a slot whose resources have already been configured (e.g., by a previously received multi-slot SFI), the UE may efficiently monitor for the SFI based at least in part on the dynamic periodicity (e.g., in a slot following the final slot covered by the previously received multi-slot SFI).

Aspects of the disclosure are initially described in the context of a wireless communications system. Aspects of the disclosure are then illustrated by and described in the context of resource configurations and timing diagrams. Aspects of the disclosure are further illustrated by and described with reference to apparatus diagrams, system diagrams, and flowcharts that relate to flexible monitoring periodicity for slot format indicator.

Figure 1:
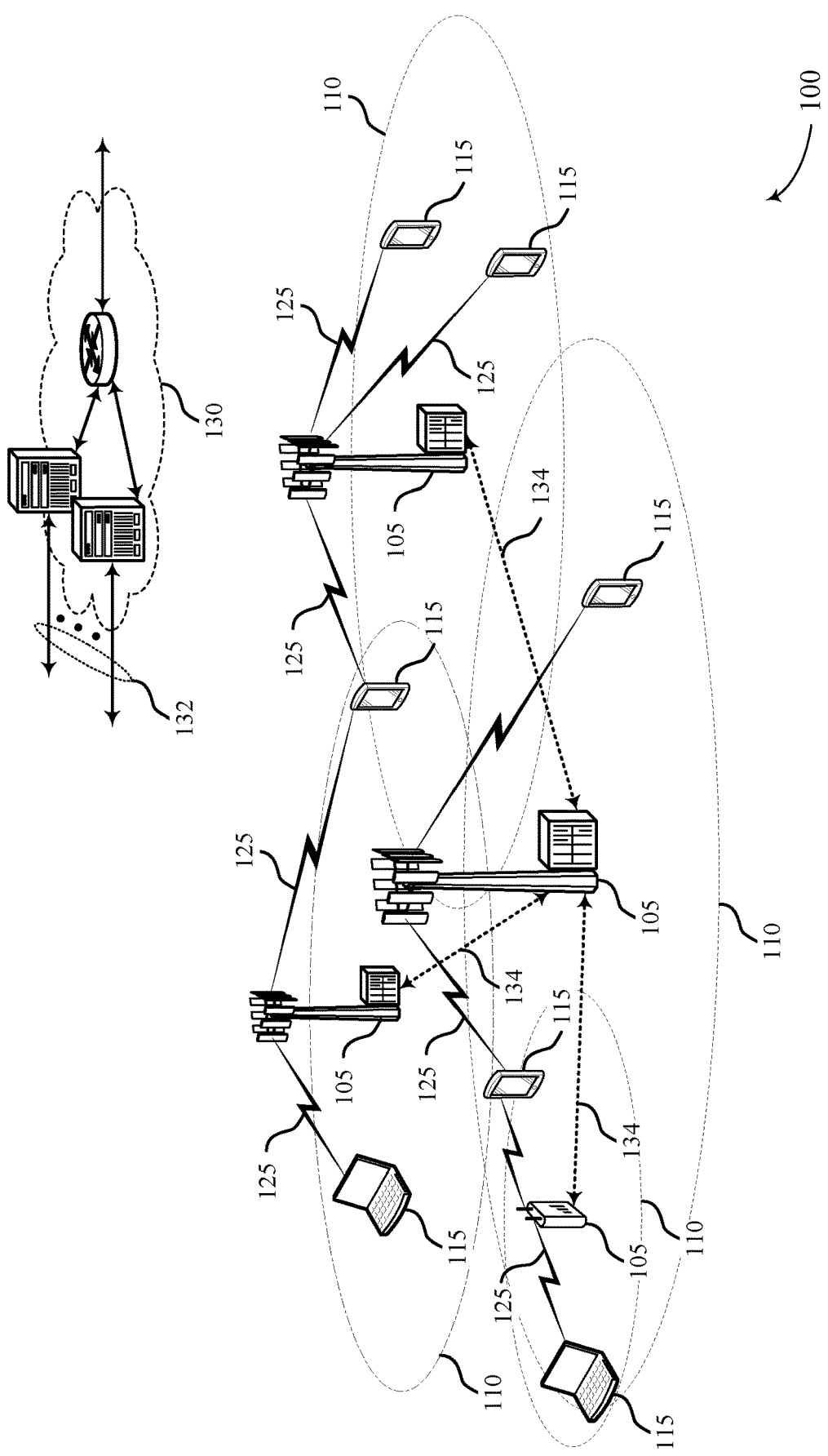
FIG. 1 illustrates an example of a system for wireless communication that supports flexible monitoring periodicity in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band.

The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105. Although aspects of the present disclosure are described in the context of slot formats, it is to be understood that the described techniques may be extended to mini-slots or any other suitable scheduling interval without deviating from the scope of the present disclosure. Accordingly, in some cases the term "slot" may be used to convey a general time interval used to coordinate resource scheduling in a wireless system.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support flexible monitoring periodicity for a SFI. For example, a UE 115 may identify a default monitoring periodicity for monitoring a control channel for the SFI (e.g., through RRC signaling). The UE 115 may then identify (e.g., receive an indication of) a dynamic monitoring periodicity and monitor the control channel for the SFI based on the dynamic monitoring periodicity.

Figure 2:
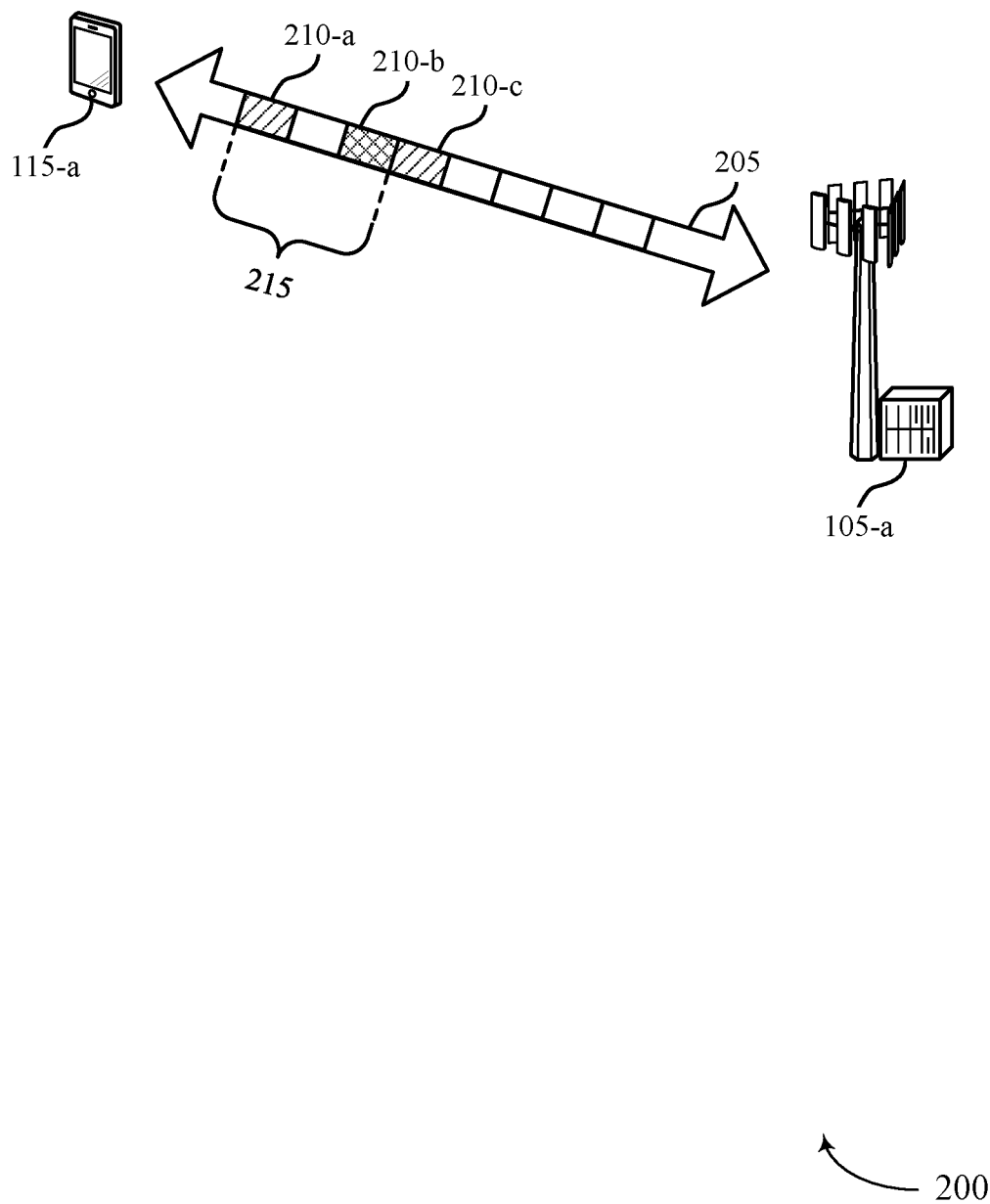
FIG. 2 illustrates an example of a wireless communications system that supports flexible monitoring periodicity in accordance with aspects of the present disclosure.

FIG. 2 illustrates an example of a wireless communications system 200 that supports flexible monitoring periodicity for SFI in accordance with various aspects of the present disclosure. In some examples, wireless communications system 200 may implement aspects of wireless communications system 100. For example, wireless communications system 200 includes a base station 105-a and a UE 115-a, each of which may be an example of the corresponding device described with reference to FIG. 1.

Base station 105-a and UE 115-a may communicate via wireless link 205, which may be an example of a communication link 125 described herein. Wireless link 205 may support communications over one or more channels, such as a GC PDCCH, which may be used to refer to a channel (e.g., either a PDCCH or a separately designed channel) that carries information intended for a group of UEs 115. It is to be understood that the term "common" as used in GC PDCCH does not necessarily imply that the GC PDCCH is common to all UEs 115 of a given cell.

Communication resources used for wireless link 205 may be organized as discussed with reference to FIG. 1. For example, the communication resources may be segmented in time into a plurality of slots 210, each of which comprises a group of symbols. Each slot 210 (e.g., or group of slots) may have a format that corresponds to and is indicated by a given SFI, which may in turn be carried over a GC PDCCH. Additionally or alternatively, the SFI may be carried by other control signaling (e.g., RRC signaling). By way of example, slot 210-a may carry a GC PDCCH intended for UE 115-a (e.g., along with one or more other UEs 115). The GC PDCCH may carry a SFI, which may be a multi-slot SFI in the present example. The multi-slot SFI may indicate a slot format for each slot of a slot group 215. It is to be understood that, while slot group 215 includes three slots 210, any suitable number of slots 210 may be included in a slot group 215. In some cases, the number of slots 210 included in slot group 215 may be indicated (e.g., implicitly or explicitly) by the SFI.

In some cases, UE 115-a may be configured (e.g., via cell-specific RRC signaling or UE-specific RRC signaling)

with a default monitoring periodicity (e.g., a default set of monitoring occasions) for GC PDCCH. For example, the configuration may be carried as part of a control resource set (coreset) configuration. By way of example, UE 115-*a* may be configured with a default monitoring periodicity that corresponds to every other slot 210 (e.g., slots 210-*a* and 210-*b* in the present example). However, because UE 115-*a* may receive the GC PDCCH and decode the multi-slot SFI in slot 210-*a* (e.g., where the multi-slot SFI indicates a slot format for each slot 210 of slot group 215), UE 115-*a* may determine that it does not need to monitor for the GC PDCCH in the next default monitoring occasion (i.e., slot 210-*b*) since the format for slot 210-*b* has already been configured. Instead, UE 115-*a* may identify (e.g., based at least in part on the previously decoded SFI) a dynamic monitoring periodicity that indicates slot 210-*c* as the next GC PDCCH monitoring occasion.

Figure 3:
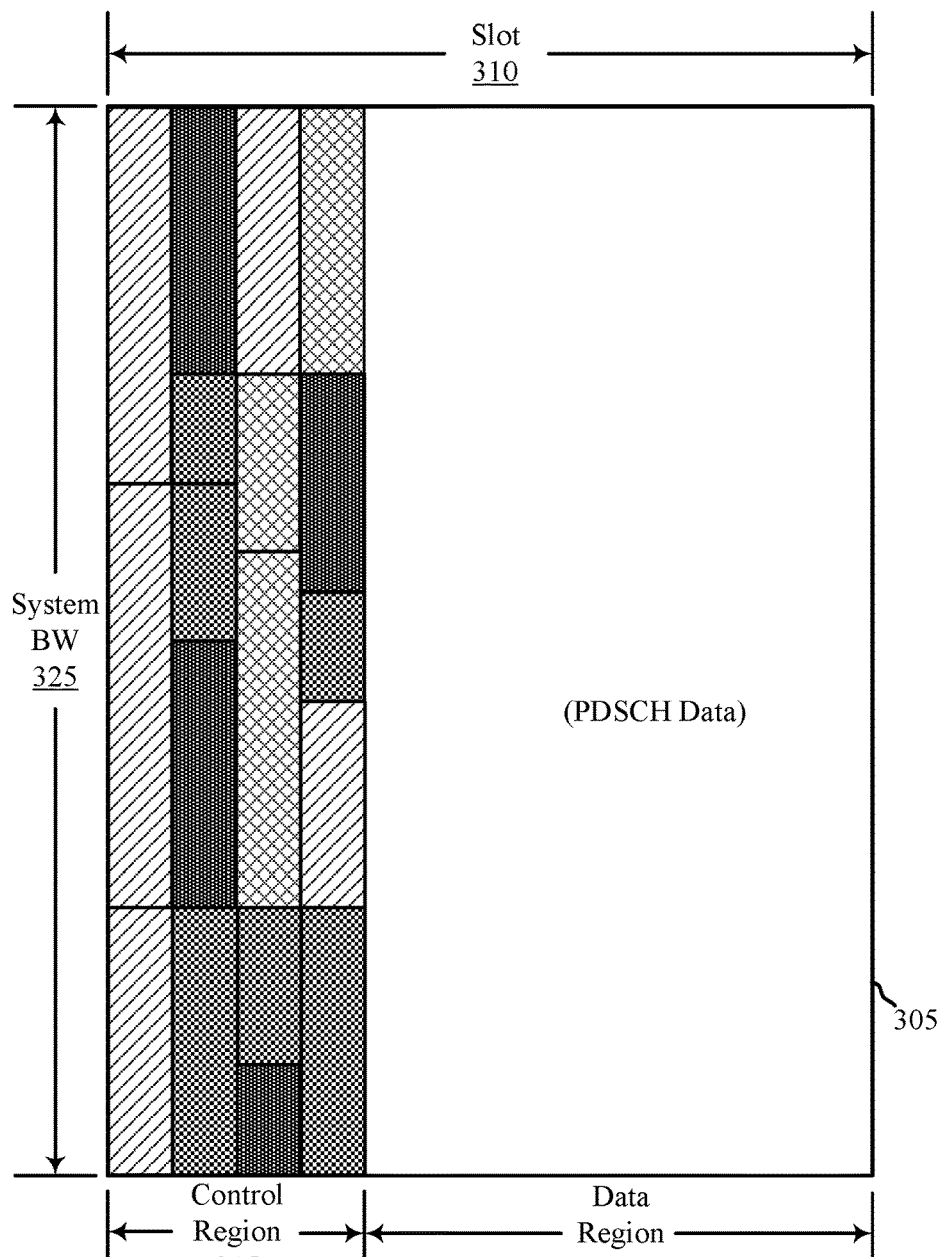
FIG. 3 illustrates an example of a slot configuration that supports flexible monitoring periodicity in accordance with aspects of the present disclosure.

FIG. 3 illustrates an example of a slot configuration 300 that supports a flexible monitoring periodicity for SFI in accordance with various aspects of the present disclosure. In some examples, slot configuration 300 may implement aspects of wireless communications system 100 and/or wireless communications system 200. Aspects of slot configuration 300 may be implemented by a UE 115 and/or a base station 105, which may be examples of the corresponding device described herein.

Slot configuration 300 may include one physical resource block (PRB) 305 spanning one slot 310. The slot 310 may consist of a number of resource elements (REs) in the time domain and a number of subcarriers in the frequency domain. The slot 310 may be divided into a control region 315 and a data region 320. The control region 315 may be subdivided into search spaces. The control region 315 may be used to carry or otherwise convey control information to UE(s) operating within the coverage area of a base station 105. Examples of the configurable search spaces include a common search space 330, a group common search space 335, a UE-specific search space 340, and unused control resources 345. The data region 320 may carry physical downlink shared channel (PDSCH) transmissions scheduled for UEs 115.

The number of subcarriers (or tones or frequencies) occupying the slot 310 may establish the system bandwidth 325. In one example, the system bandwidth 325 may include 12 subcarriers, or some other number of subcarriers. An intersection of one subcarrier occurring during one symbol period may constitute a RE, and the control information may be carried in one or more control channel elements (CCEs). One or more CCEs may be assigned to a search space of one or more UEs 115, and each UE 115 may find its PDCCH in the assigned CCEs (e.g., using a process which may be referred to as a blind decode). In some aspects, the UE 115 may be configured to support the full system bandwidth (e.g., system bandwidth 325) or may be configured to support a subset of the full system bandwidth.

The number of CCEs available for carrying the PDCCH may be variable depending on the number of OFDM symbols used, the bandwidth of the system, and/or a number of antenna ports present at the base station 105. In some examples, consecutive CCEs may be mapped into resource element groups (REGs) that are distributed (i.e., non-consecutive) in frequency. Consecutive CCEs may refer to CCEs that are consecutive in their numbering or ordering in the logical space. Two REGs are not consecutive when they are not adjacent to each other (separated by one or more REs). This may be referred to as distributed CCE-to-REG mapping. In some examples, consecutive CCEs are mapped to REGs that are consecutive in frequency. This may be referred to as localized CCE-to-REG mapping. For example, consecutive or adjacent REGs are not separated from each other by one or more REs.

It is to be understood that the particular mapping/arrangement of CCE(s) into search spaces may vary and the slot configuration 300 illustrated in FIG. 3 is one example only. That is, there may be more or fewer common search spaces 330, group common search spaces 335, UE-specific search spaces 340, and/or unused control resources 345, and each search space may have a different size and/or arrangement than is illustrated in slot configuration 300.

Group common search space 335 may carry a GC PDCCH for a group of UEs 115. In some cases, a network entity may configure (e.g., via RRC signaling) a UE 115 to decode the GC PDCCH (e.g., to perform blind decoding on the group common search space 335). In some cases, if the UE 115 does not receive a GC PDCCH in slot 310, it may be able to receive at least the PDCCH (e.g., which may be carried in common search space 330) in the slot 310. As supported by aspects of the present disclosure, a UE 115 may determine whether some blind decodings (e.g., or group common search space 335) can be skipped based on a decoded multi-slot SFI.

Figure 4:
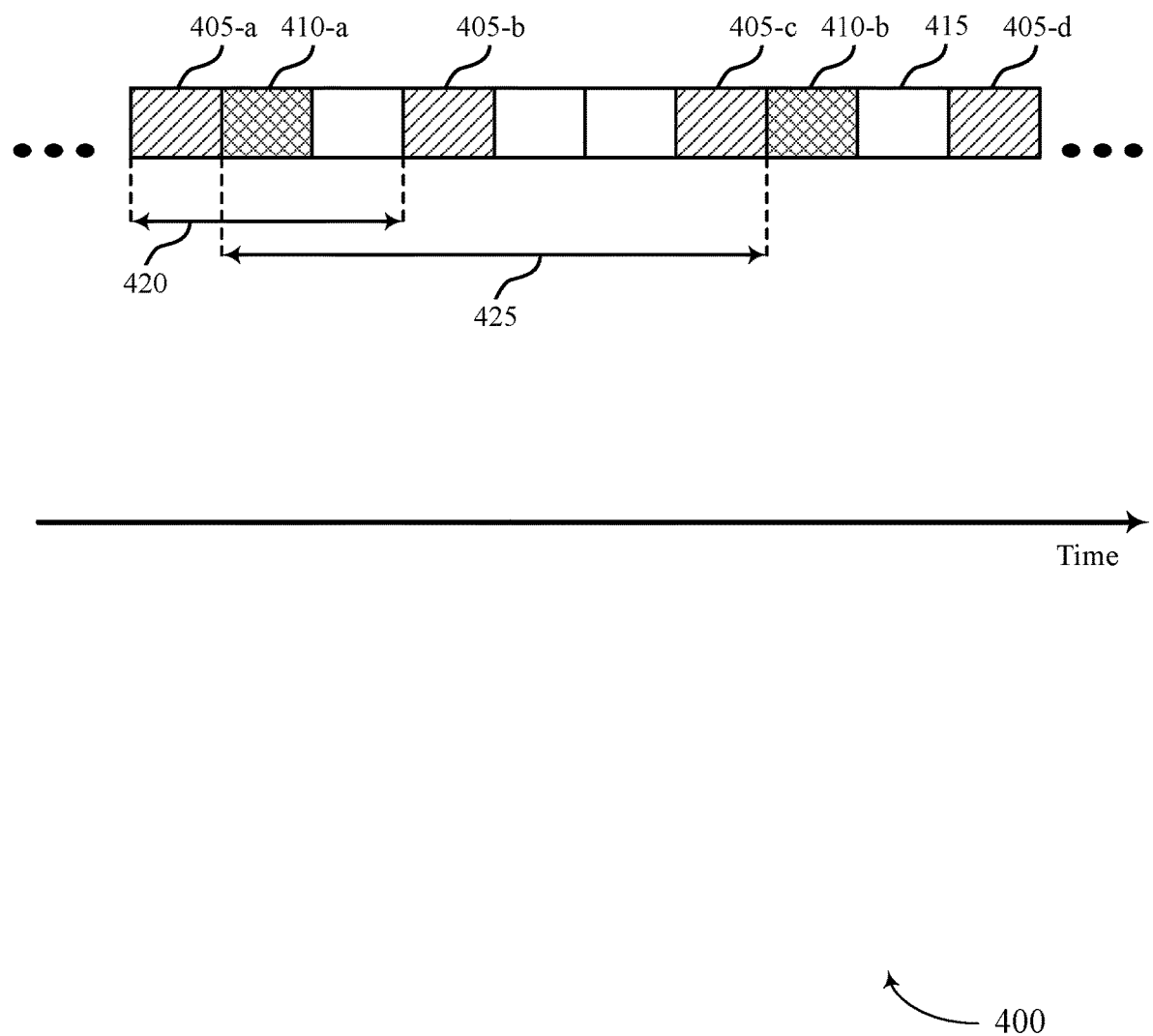
FIG. 4 illustrates an example of a timing diagram that supports flexible monitoring periodicity in accordance with aspects of the present disclosure.

FIG. 4 illustrates an example of a timing diagram 400 that supports flexible monitoring periodicity for SFI in accordance with various aspects of the present disclosure. In some examples, timing diagram 400 may implement aspects of wireless communications system 100. For example, timing diagram 400 may be implemented by a base station 105 or a UE 115. Timing diagram 400 is included for the sake of explanation and is not intended to be limiting of scope. In aspects of the following, monitoring occasion and slot may be used interchangeably. However, in some cases the two may refer to distinct time periods. For example, a monitoring occasion may in some cases include a group of slots.

For example, a base station 105 (e.g., or some other suitable network entity) may configure a UE 115 with a set of default monitoring occasions 405 (e.g., via RRC signaling). The default monitoring occasions 405 may correspond to a set of slots, which may be or embody aspects of slot configuration 300. As illustrated, the default monitoring occasions may be regularly spaced in time (e.g., based on default monitoring periodicity 420). However, this regular spacing may in some cases negatively impact a wireless system (e.g., compared to more dynamic spacing techniques).

As an example, a UE 115 may identify a dynamic monitoring periodicity including monitoring occasions 410, based on a previously received SFI. In some examples, a UE 115 may receive a PDCCH (e.g., a GC PDCCH) during default monitoring occasion 405-*a*. The GC PDCCH may include a SFI indicating a format for a single slot (e.g., the slot corresponding to default monitoring occasion 405-*a*) in the present example. Accordingly, the UE 115 may monitor for a GC PDCCH in dynamic monitoring occasion 410-*a* (e.g., rather than waiting until default monitoring occasion 405-*b*). The UE 115 may receive the GC PDCCH and decode a multi-slot SFI during dynamic monitoring occasion 410-*a*. Because the multi-slot SFI configures a slot format for multiple slots, the UE 115 may identify a dynamic monitoring period 425. In the present example, the multi-slot SFI configures the slot format for six slots. Accordingly, the UE 115 may forego default monitoring occasions 405-*b*, 405-*c* (e.g., because the formats for at least some of the slots corresponding to these occasions are covered by the multi-slot SFI). The UE 115 may resume monitoring for the GC PDCCH during dynamic monitoring occasion 410-*b* (e.g., a monitoring occasion immediately following the conclusion of dynamic monitoring period 425). It is to be understood that, in some cases, the UE 115 may resume monitoring for the GC PDCCH in a monitoring occasion that is not immediately subsequent to the conclusion of the dynamic monitoring period 425 (e.g., may instead identify a monitoring occasion that is n slots subsequent to the conclusion of the dynamic monitoring period 425).

Returning to the present example, the UE 115 may attempt to decode a SFI during dynamic monitoring occasion 410-*b*. However, in some cases, the decoding operation may fail (e.g., because the UE 115 receives a corrupted transmission, because a base station 105 does not transmit a GC PDCCH, etc.). When the UE 115 fails in decoding the GC PDCCH, it may in some cases monitor for a GC PDCCH during every monitoring occasion (e.g., including monitoring occasion 415) until it reaches the next default monitoring occasion 405-*d*. Such a monitoring pattern may, for example, allow the UE 115 to resume the dynamic monitoring periodicity in the case that the dynamic monitoring periodicity is smaller than the default monitoring periodicity 420. Alternatively, the UE 115 may immediately follow default monitoring periodicity 420 upon failing a decoding operation (e.g., may next attempt to receive a GC PDCCH during default monitoring occasion 405-*d* without attempting to receive the GC PDCCH during monitoring occasion 415). In each case, once the UE 115 receives the GC PDCCH, the flexible monitoring may resume.

Although the present example illustrates the dynamic monitoring period 425 as being longer than the default monitoring period, it is to be understood that the number of slots indicated by the SFI may be smaller than, equal to, or larger than the default monitoring periodicity 420. If the number of slots is smaller than the default monitoring periodicity 420, more dynamic control of SFI may be achieved. Alternatively, if the number of slots is larger than the default monitoring periodicity 420, overhead for the control signaling may be reduced (e.g., because the SFI may be transmitted less frequently). If the number of slots is equal to the default monitoring periodicity 420, the dynamic monitoring occasions 410 may in some cases be offset from the default monitoring occasions 405. In accordance with the described techniques, a UE 115 may switch (e.g., dynamically) between default monitoring occasions 405 and dynamic monitoring occasions 410 (e.g., based on a success of decoding a SFI during a given monitoring occasion). For instance, the UE 115 may switch to the dynamic monitoring periodicity from the default monitoring periodicity, and may later switch back to the default monitoring periodicity. Or, the UE 115 may switch to the dynamic monitoring periodicity and may cancel one or more monitoring occasions associated with the default monitoring periodicity.

Figure 5:
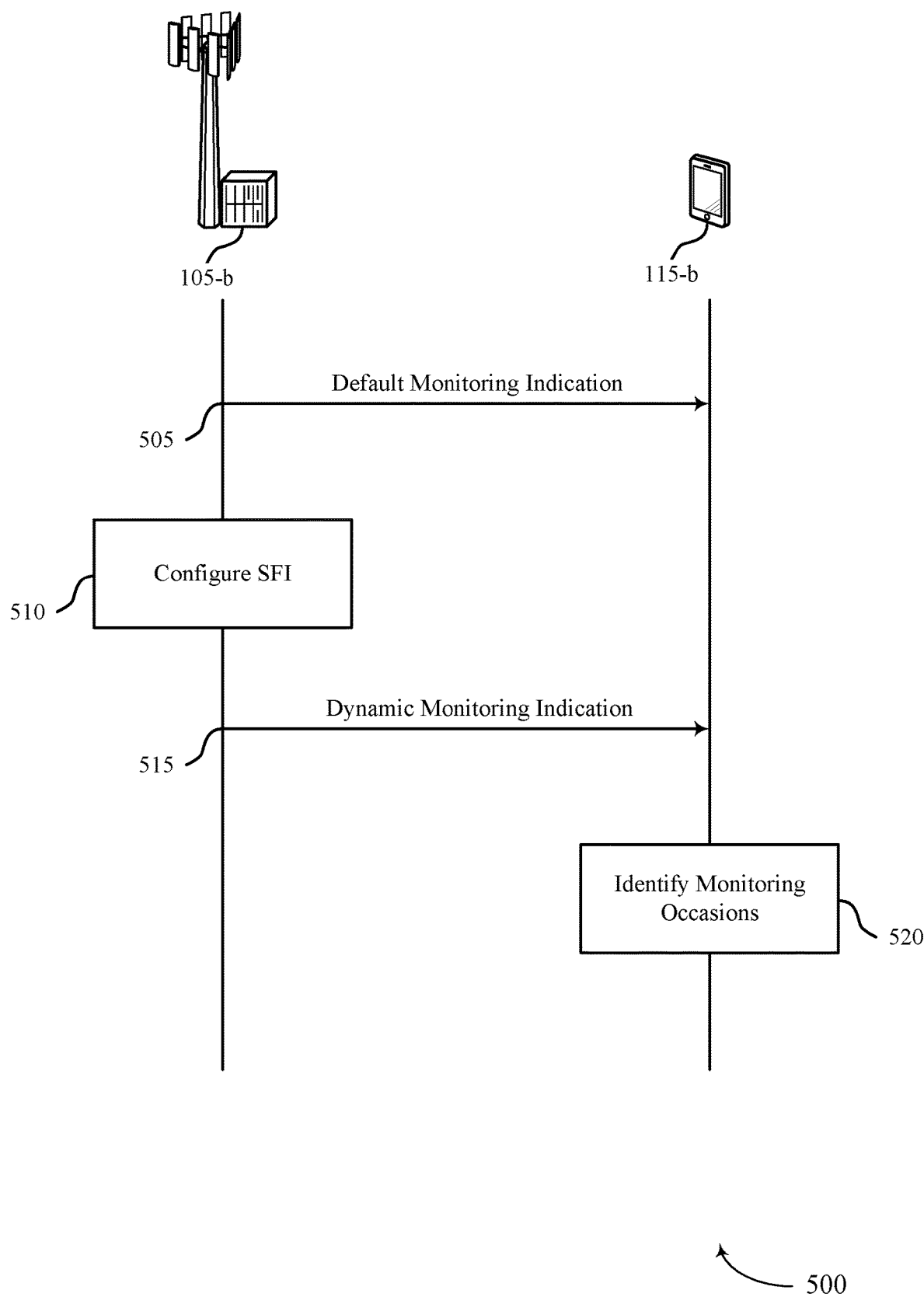
FIG. 5 illustrates an example process flow that supports flexible monitoring periodicity in accordance with aspects of the present disclosure.

FIG. 5 illustrates an example of a process flow 500 that supports flexible monitoring periodicity in accordance with various aspects of the present disclosure. In some examples, process flow 500 may implement aspects of wireless communications system 100. For example, process flow 500 includes a base station 105-*b* and a UE 115-*b*, each of which may be an example of the corresponding device described herein.

At 505, base station 105-*b* (e.g., or some other network entity) may identify a default monitoring periodicity to UE 115-*b*. For example, the default monitoring periodicity may be indicated via control signaling such as cell-specific RRC signaling or UE-specific RRC signaling. In some cases, UE 115-*b* may identify a set of monitoring occasions based on the default monitoring periodicity. That is, the default monitoring periodicity may indicate a set of occasions for monitoring a control channel (e.g., a GC PDCCH) for a SFI.

At 510, base station 105-*b* may configure a SFI which indicates whether symbols for one or more slots are configured for uplink communications, downlink communications, are reserved (e.g., where reserved symbols may in some cases be re-configured for uplink or downlink communications by some other signaling such as downlink control information (DCI), or are gap symbols. For example, the slot format may be based on a traffic load (e.g., a format with a larger proportion of downlink symbols may be selected when there is a larger amount of downlink data to be transmitted, etc.).

At 515, base station 105-*b* may identify a dynamic monitoring periodicity for monitoring the control channel for the SFI. In some examples, base station 105-*b* may transmit (e.g., and UE 115-*b* may receive) an indication of a dynamic monitoring periodicity for monitoring the control channel for the SFI. Base station 105-*b* may transmit the indication in an SFI. UE 115-*b* may identify a dynamic monitoring periodicity based at least in part on a received SFI. In some cases, the dynamic monitoring periodicity is less than or greater than the default monitoring periodicity. Alternatively, the dynamic monitoring periodicity may be equal to (e.g., but offset from) the default monitoring periodicity such that monitoring occasions of the respective periodicities are staggered in time. In some cases, the indication of the dynamic monitoring periodicity is received in the SFI itself.

At 520, UE 115-*b* may identify a set of monitoring occasions based on the dynamic monitoring indication and/or the default monitoring indication. UE 115-*b* may monitor the control channel for the SFI based at least in part on the identified set of monitoring occasions. For example, UE 115-*b* may decode, during a first monitoring occasion, the SFI associated with a first set of slots based at least in part on the default monitoring periodicity. Alternatively, UE 115-*b* may decode the SFI during a first monitoring occasion based at least in part on the dynamic monitoring periodicity. UE 115-*b* may identify a second monitoring occasion based at least in part on a number of slots in the first set of slots and monitor, during the second monitoring occasion, the control channel for the SFI associated with a second set of slots. In some cases, the second set of slots includes a next (e.g., temporally) slot following the first set of slots. In some cases, the first set of slots, the second set of slots, or both consist of a single slot.

In some examples, UE 115-*b* may refrain from monitoring the control channel during monitoring occasions not associated with the dynamic monitoring periodicity. For instance, UE 115-*b* may refrain from monitoring the control channel during monitoring occasions not associated with the dynamic monitoring periodicity during a period of time or for a number of slots. In some examples, the UE 115-*b* may cancel one or more, or all monitoring occasions associated with the default monitoring periodicity. In some cases, UE 115-*b* may fail to decode the SFI during a monitoring occasion associated with the dynamic monitoring periodicity. UE 115-*b* may in some cases monitor the control channel in each slot subsequent to the monitoring occasion until a monitoring occasion associated with the default monitoring periodicity is reached and/or until a second dynamic monitoring periodicity is received, or until an indication of the first original dynamic monitoring periodicity is received. The second dynamic monitoring periodicity may be the same as or different than the original dynamic monitoring periodicity. Alternatively, UE 115-*b* may monitor the control channel for the SFI based at least in part on the default monitoring periodicity (e.g., using the default monitoring occasions) until a second indication of the dynamic monitoring periodicity is received, or until a second monitoring periodicity is received. In each case, UE 115-*b* may monitor for the SFI based at least in part on the second indication of the dynamic monitoring periodicity, or based at least in part on the second dynamic monitoring periodicity.

Figure 6:
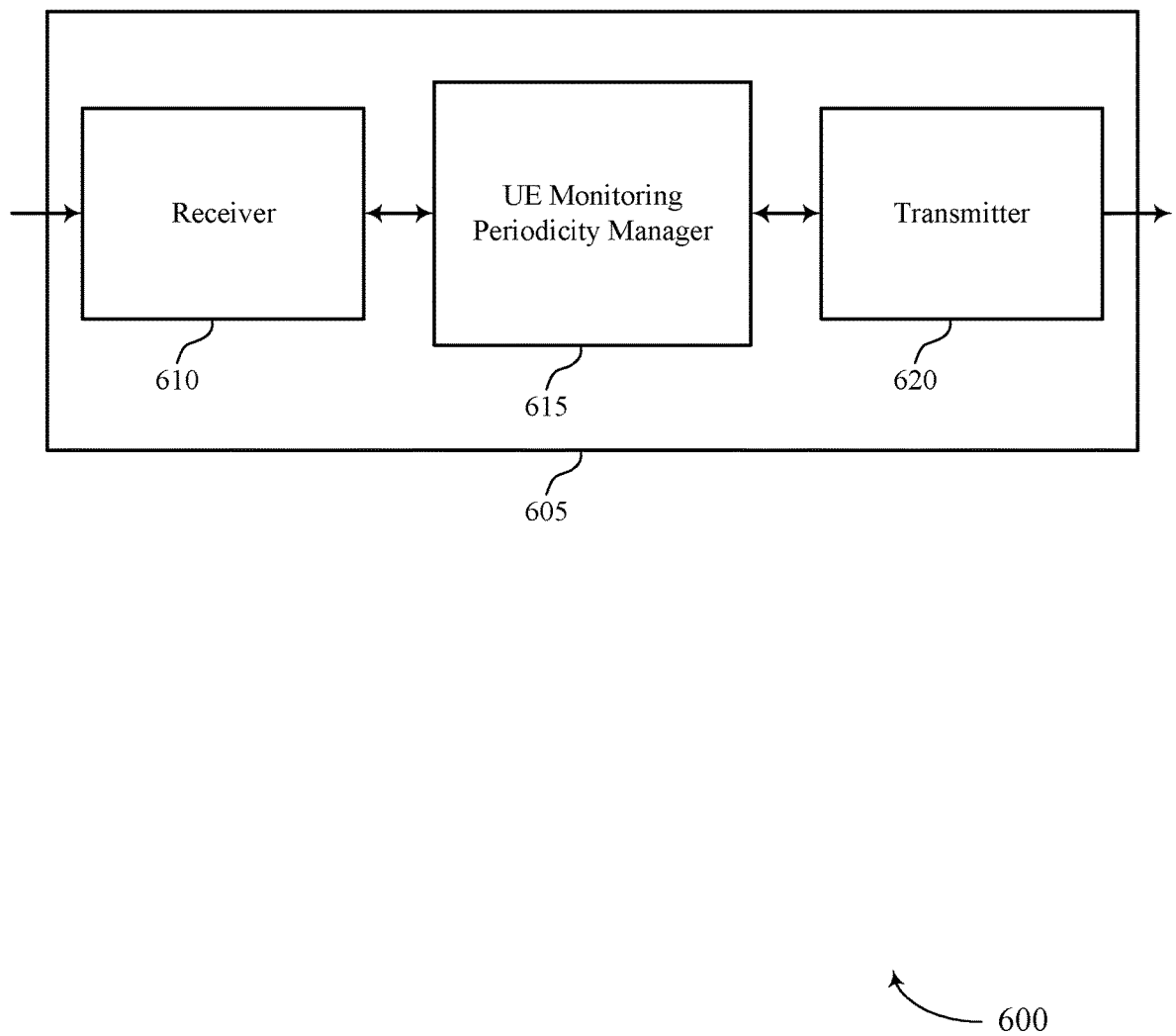
FIGS. 6 through 8 show block diagrams of a device that supports flexible monitoring periodicity in accordance with aspects of the present disclosure.

FIG. 6 shows a block diagram 600 of a wireless device 605 that supports flexible monitoring periodicity in accordance with aspects of the present disclosure. Wireless device 605 may be an example of aspects of a UE 115 as described herein. Wireless device 605 may include receiver 610, UE monitoring periodicity manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to flexible monitoring periodicity, etc.). Information may be passed on to other components of the device. The receiver 610 may be an example of aspects of the transceiver 935 described with reference to FIG. 9. The receiver 610 may utilize a single antenna or a set of antennas.

UE monitoring periodicity manager 615 may be an example of aspects of the UE monitoring periodicity manager 915 described with reference to FIG. 9. UE monitoring periodicity manager 615 and/or at least some of its various sub-components may be implemented in hardware, software executed by a processor, firmware, or any combination thereof. If implemented in software executed by a processor, the functions of the UE monitoring periodicity manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE monitoring periodicity manager 615 and/or at least some of its various sub-components may be physically located at various positions, including being distributed such that portions of functions are implemented at different physical locations by one or more physical devices. In some examples, UE monitoring periodicity manager 615 and/or at least some of its various sub-components may be a separate and distinct component in accordance with various aspects of the present disclosure. In other examples, UE monitoring periodicity manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE monitoring periodicity manager 615 may identify a default monitoring periodicity for monitoring a control channel for a SFI, receive an indication of a dynamic monitoring periodicity for monitoring the control channel for the SFI, and monitor the control channel for the SFI based on the dynamic monitoring periodicity.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
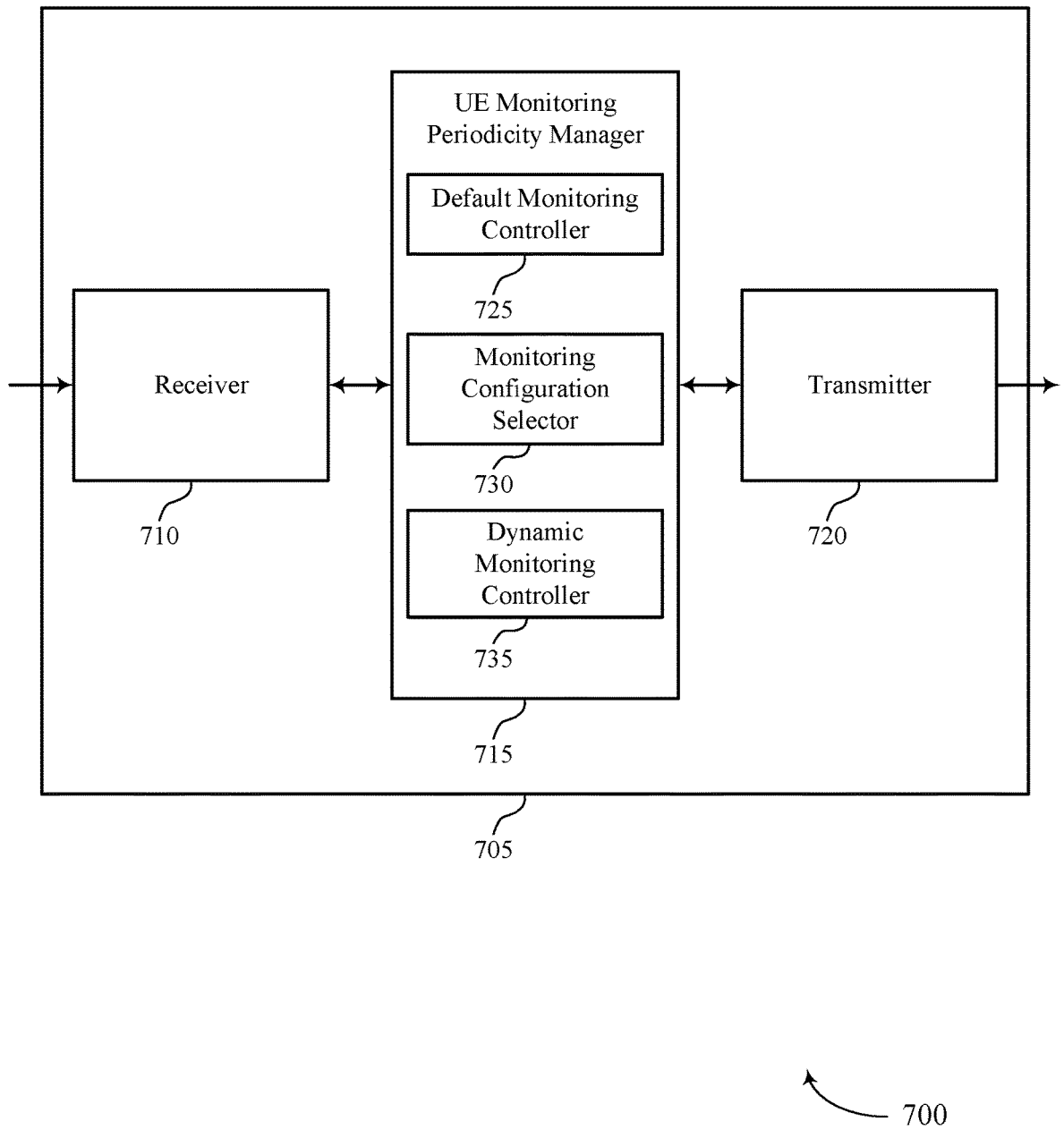

FIG. 7 shows a block diagram 700 of a wireless device 705 that supports flexible monitoring periodicity in accordance with aspects of the present disclosure. Wireless device 705 may be an example of aspects of a wireless device 605 or a UE 115 as described with reference to FIG. 6. Wireless device 705 may include receiver 710, UE monitoring periodicity manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to flexible monitoring periodicity, etc.). Information may be passed on to other components of the device. The receiver 710 may be an example of aspects of the transceiver 935 described with reference to FIG. 9. The receiver 710 may utilize a single antenna or a set of antennas.

UE monitoring periodicity manager 715 may be an example of aspects of the UE monitoring periodicity manager 915 described with reference to FIG. 9. UE monitoring periodicity manager 715 may also include default monitoring controller 725, monitoring configuration selector 730, and dynamic monitoring controller 735.

Default monitoring controller 725 may identify a default monitoring periodicity for monitoring a control channel for a SFI. Default monitoring controller 725 may monitor the control channel for the SFI based on the second dynamic monitoring periodicity. Default monitoring controller 725 may monitor the control channel for the SFI based on the default monitoring periodicity until a second dynamic monitoring periodicity is received. Default monitoring controller 725 may identify a set of monitoring occasions based on the default monitoring periodicity. In some cases, the SFI indicates whether symbols for one or more slots are configured for uplink communications, downlink communications, or are reserved. In some cases, the control channel includes a GC PDCCH.

Monitoring configuration selector 730 may receive an indication of a dynamic monitoring periodicity for monitoring the control channel for the SFI. Monitoring configuration selector 730 may identify a second monitoring occasion based on a number of slots in the first set of slots. Monitoring configuration selector 730 may refrain from monitoring the control channel during monitoring occasions not associated with the dynamic monitoring periodicity. Monitoring configuration selector 730 may monitor the control channel in each slot subsequent to the monitoring occasion until a monitoring occasion associated with the default monitoring periodicity is reached. Monitoring configuration selector 730 may receive a second indication of the dynamic monitoring periodicity during the monitoring occasion associated with the default monitoring periodicity based at least in part on a second received SFI. In some examples, monitoring configuration selector 730 may identify a second dynamic monitoring periodicity during the monitoring occasion associated with the default monitoring periodicity based at least in part on the second received SFI. The second dynamic monitoring periodicity may be the same or different from the first dynamic monitoring periodicity. Monitoring configuration selector 730 may receive control signaling that indicates the default monitoring periodicity. In some cases, the control signaling includes cell-specific RRC signaling or UE-specific RRC signaling.

Dynamic monitoring controller 735 may monitor, during the second monitoring occasion, the control channel for the SFI associated with a second set of slots. Dynamic monitoring controller 735 may monitor the control channel for the SFI based on the dynamic monitoring periodicity. Dynamic monitoring controller 735 may monitor the control channel for the SFI based on the second dynamic monitoring periodicity. In some cases, the second set of slots includes a next slot following the first set of slots. In some cases, the dynamic monitoring periodicity is less than or greater than the default monitoring periodicity. In some cases, the dynamic monitoring periodicity is equal to the default monitoring periodicity and a monitoring occasion for the SFI associated with the dynamic monitoring periodicity is different from a monitoring occasion for the SFI associated with the default monitoring periodicity. In some cases, the indication of the dynamic monitoring periodicity is received in the SFI.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
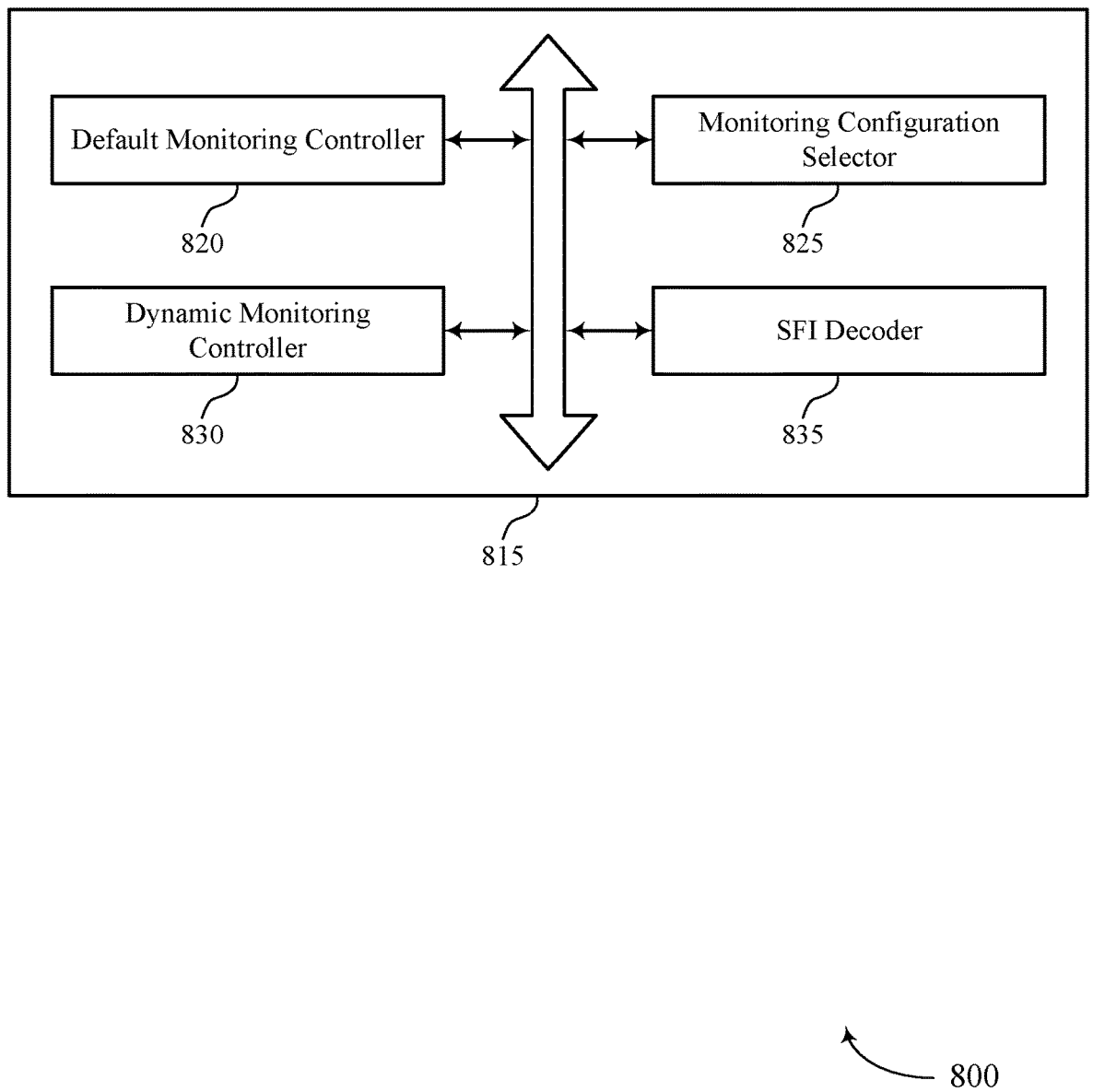

FIG. 8 shows a block diagram 800 of a UE monitoring periodicity manager 815 that supports flexible monitoring periodicity in accordance with aspects of the present disclosure. The UE monitoring periodicity manager 815 may be an example of aspects of a UE monitoring periodicity manager 615, a UE monitoring periodicity manager 715, or a UE monitoring periodicity manager 915 described with reference to FIGS. 6, 7, and 9. The UE monitoring periodicity manager 815 may include default monitoring controller 820, monitoring configuration selector 825, dynamic monitoring controller 830, and SFI decoder 835. Each of these modules may communicate, directly or indirectly, with one another (e.g., via one or more buses).

Default monitoring controller 820 may identify a default monitoring periodicity for monitoring a control channel for a SFI. Default monitoring controller 820 may monitor the control channel for the SFI based on the second dynamic monitoring periodicity. Default monitoring controller 820 may monitor the control channel for the SFI based on the default monitoring periodicity until a second dynamic monitoring periodicity is received. Default monitoring controller 820 may identify a set of monitoring occasions based on the default monitoring periodicity. In some cases, the SFI indicates whether symbols for one or more slots are configured for uplink communications, downlink communications, or are reserved. In some cases, the control channel includes a GC PDCCH.

Monitoring configuration selector 825 may receive an indication of a dynamic monitoring periodicity for monitoring the control channel for the SFI. Monitoring configuration selector 825 may identify a second monitoring occasion based on a number of slots in the first set of slots. Monitoring configuration selector 825 may refrain from monitoring the control channel during monitoring occasions not associated with the dynamic monitoring periodicity. Monitoring configuration selector 825 may monitor the control channel in each slot subsequent to the monitoring occasion until a monitoring occasion associated with the default monitoring periodicity is reached. Monitoring configuration selector 825 may receive a second indication of the dynamic monitoring periodicity during the monitoring occasion associated with the default monitoring periodicity based at least in part on a second received SFI. In some examples, monitoring configuration selector 825 may identify a second dynamic monitoring periodicity during the monitoring occasion associated with the default monitoring periodicity based at least in part on the second received SFI. The second dynamic monitoring periodicity may be the same or different from the first dynamic monitoring periodicity. Monitoring configuration selector 825 may receive control signaling that indicates the default monitoring periodicity. In some cases, the control signaling includes cell-specific RRC signaling or UE-specific RRC signaling.

Dynamic monitoring controller 830 may monitor, during the second monitoring occasion, the control channel for the SFI associated with a second set of slots. Dynamic monitoring controller 830 may monitor the control channel for the SFI based on the dynamic monitoring periodicity. Dynamic monitoring controller 830 may monitor the control channel for the SFI based on the second dynamic monitoring periodicity. In some cases, the second set of slots includes a next slot following the first set of slots. In some cases, the dynamic monitoring periodicity is less than or greater than the default monitoring periodicity. In some cases, the dynamic monitoring periodicity is equal to the default monitoring periodicity and a monitoring occasion for the SFI associated with the dynamic monitoring periodicity is different from a monitoring occasion for the SFI associated with the default monitoring periodicity. In some cases, the indication of the dynamic monitoring periodicity is received in the SFI.

SFI decoder 835 may decode, during a first monitoring occasion, the SFI associated with a first set of slots based on the default monitoring periodicity. SFI decoder 835 may decode, during a first monitoring occasion, the SFI associated with a first set of slots based on the dynamic monitoring periodicity. In some cases, SFI decoder 835 may fail to decode the SFI during a monitoring occasion associated with the dynamic monitoring periodicity. In some cases, the first set of slots, or the second set of slots, or both consist of a single slot.

Figure 9:
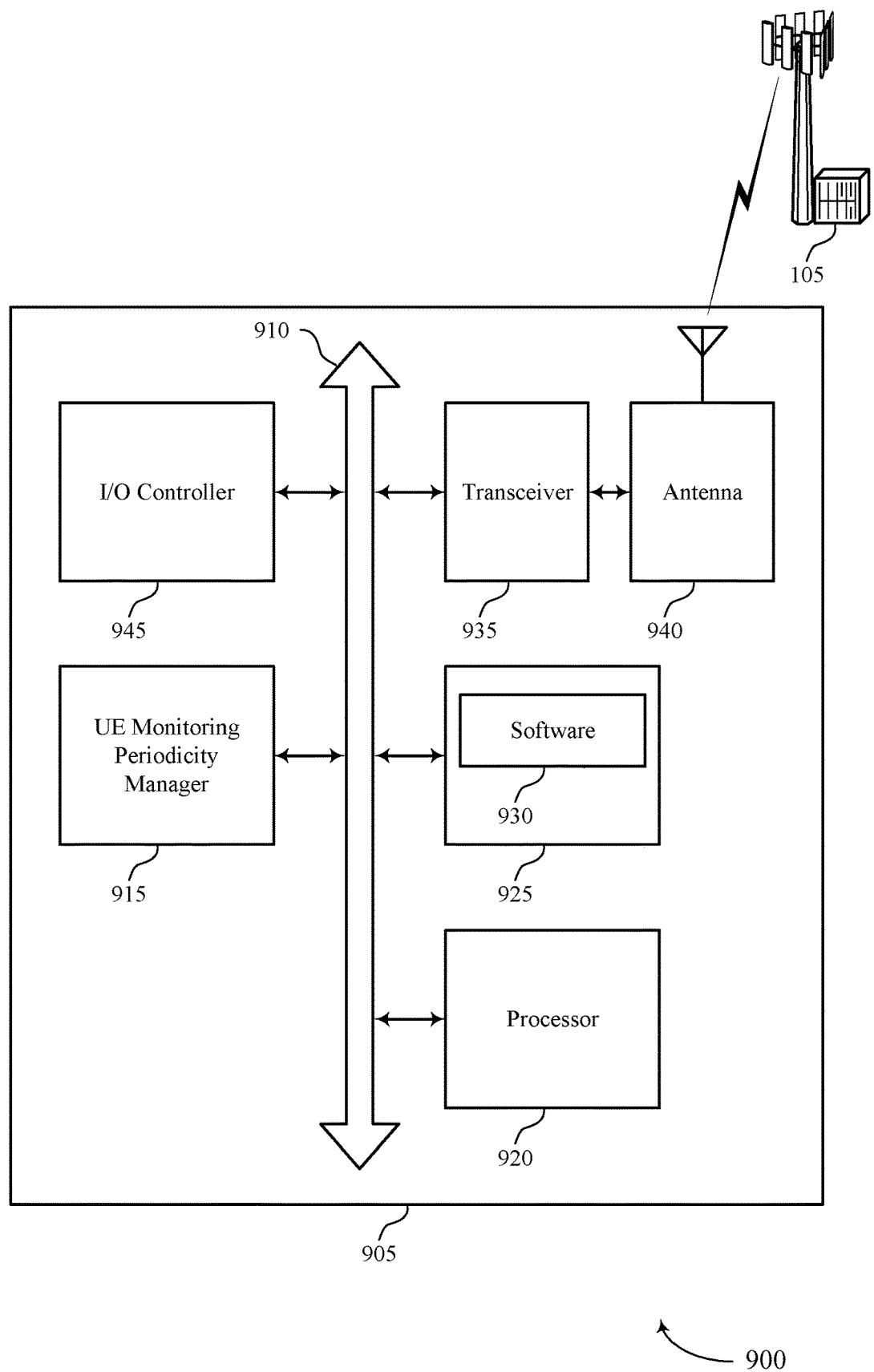
FIG. 9 illustrates a block diagram of a system including a user equipment (UE) that supports flexible monitoring periodicity in accordance with aspects of the present disclosure.

FIG. 9 shows a diagram of a system 900 including a device 905 that supports flexible monitoring periodicity in accordance with aspects of the present disclosure. Device 905 may be an example of or include the components of wireless device 605, wireless device 705, or a UE 115 as described herein, e.g., with reference to FIGS. 6 and 7. Device 905 may include components for bi-directional voice and data communications including components for transmitting and receiving communications, including UE monitoring periodicity manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting flexible monitoring periodicity).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support flexible monitoring periodicity. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described herein. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
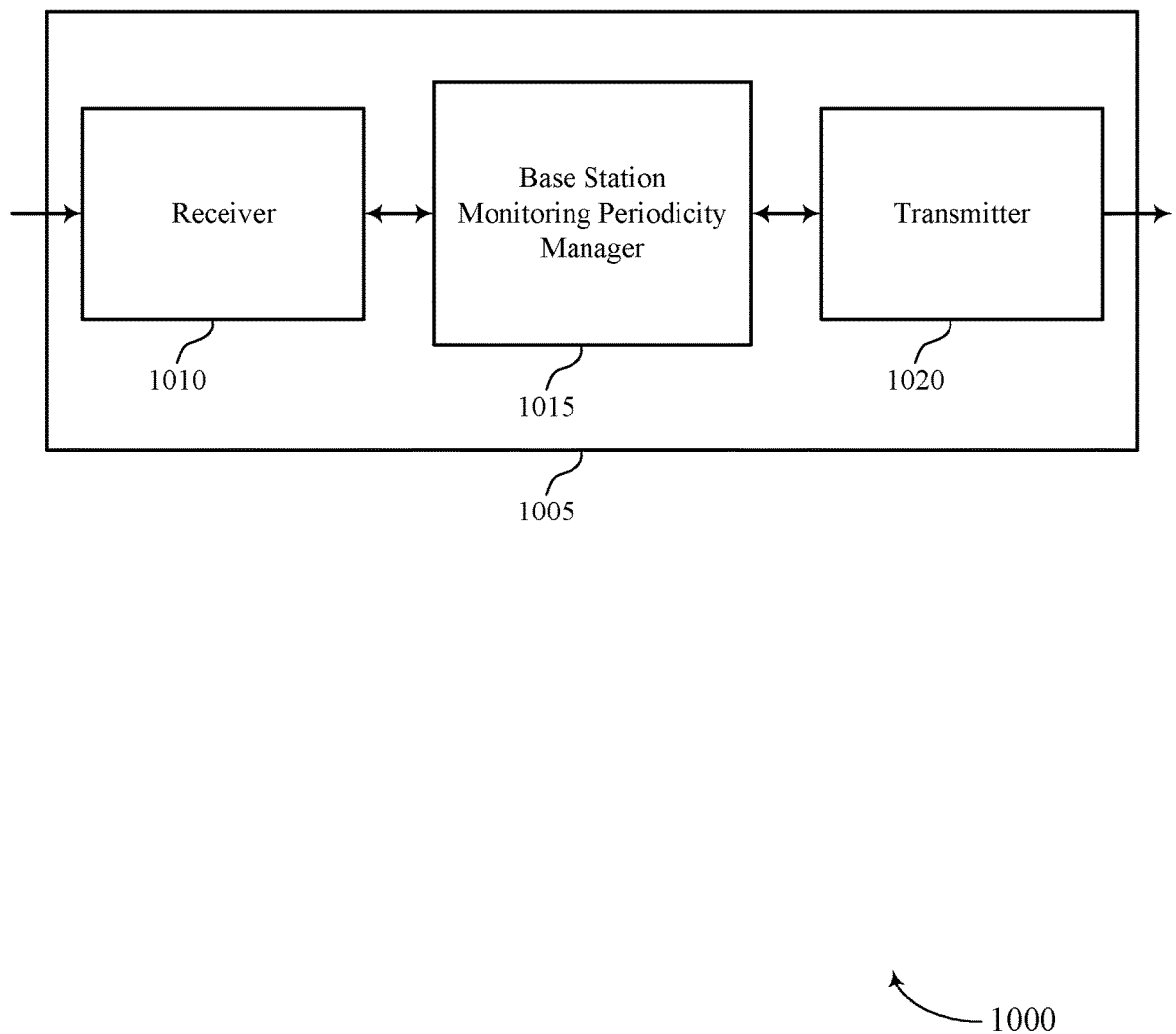
FIGS. 10 through 12 show block diagrams of a device that supports flexible monitoring periodicity in accordance with aspects of the present disclosure.

FIG. 10 shows a block diagram 1000 of a wireless device 1005 that supports flexible monitoring periodicity in accordance with aspects of the present disclosure. Wireless device 1005 may be an example of aspects of a base station 105 as described herein. Wireless device 1005 may include receiver 1010, base station monitoring periodicity manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to flexible monitoring periodicity, etc.). Information may be passed on to other components of the device. The receiver 1010 may be an example of aspects of the transceiver 1335 described with reference to FIG. 13. The receiver 1010 may utilize a single antenna or a set of antennas.

Base station monitoring periodicity manager 1015 may be an example of aspects of the base station monitoring periodicity manager 1315 described with reference to FIG. 13.

Base station monitoring periodicity manager 1015 and/or at least some of its various sub-components may be implemented in hardware, software executed by a processor, firmware, or any combination thereof. If implemented in software executed by a processor, the functions of the base station monitoring periodicity manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station monitoring periodicity manager 1015 and/or at least some of its various sub-components may be physically located at various positions, including being distributed such that portions of functions are implemented at different physical locations by one or more physical devices. In some examples, base station monitoring periodicity manager 1015 and/or at least some of its various sub-components may be a separate and distinct component in accordance with various aspects of the present disclosure. In other examples, base station monitoring periodicity manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station monitoring periodicity manager 1015 may transmit control signaling indicating a default monitoring periodicity for monitoring a control channel, configure a SFI that indicates a transmission format for one or more slots, and identify a dynamic monitoring periodicity for monitoring the control channel for the SFI. In some examples, base station monitoring periodicity manager 1015 may transmit, in an SFI, an indication of the dynamic monitoring periodicity.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
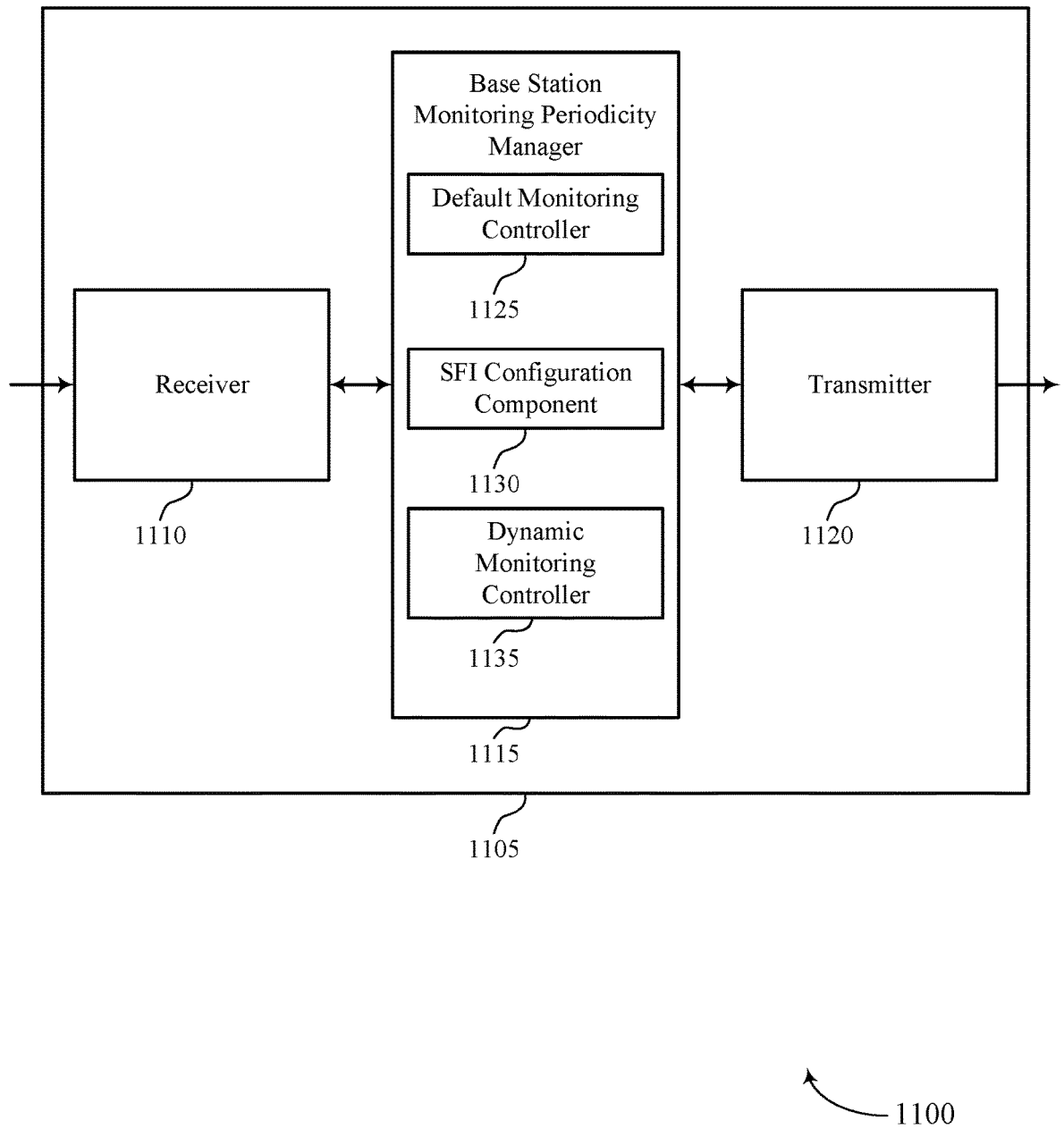

FIG. 11 shows a block diagram 1100 of a wireless device 1105 that supports flexible monitoring periodicity in accordance with aspects of the present disclosure. Wireless device 1105 may be an example of aspects of a wireless device 1005 or a base station 105 as described with reference to FIG. 10. Wireless device 1105 may include receiver 1110, base station monitoring periodicity manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to flexible monitoring periodicity, etc.). Information may be passed on to other components of the device. The receiver 1110 may be an example of aspects of the transceiver 1335 described with reference to FIG. 13. The receiver 1110 may utilize a single antenna or a set of antennas.

Base station monitoring periodicity manager 1115 may be an example of aspects of the base station monitoring periodicity manager 1315 described with reference to FIG. 13.

Base station monitoring periodicity manager 1115 may also include default monitoring controller 1125, SFI configuration component 1130, and dynamic monitoring controller 1135.

Default monitoring controller 1125 may transmit control signaling indicating a default monitoring periodicity for monitoring a control channel. In some cases, the control signaling includes cell-specific RRC signaling or UE specific RRC signaling. In some cases, the control channel includes a GC PDCCH.

SFI configuration component 1130 may configure a SFI that indicates a transmission format for one or more slots. In some cases, the SFI indicates whether symbols for the one or more slots are configured for uplink communications, downlink communications, or are reserved.

Dynamic monitoring controller 1135 may identify a dynamic monitoring periodicity for monitoring the control channel for the SFI. In some cases, the dynamic monitoring periodicity is less than or greater than the default monitoring periodicity. In some cases, the dynamic monitoring periodicity is equal to the default monitoring periodicity and a monitoring occasion for the SFI associated with the dynamic monitoring periodicity is different from a monitoring occasion for the SFI associated with the default monitoring periodicity. In some cases, the indication of the dynamic monitoring periodicity is transmitted in the SFI.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
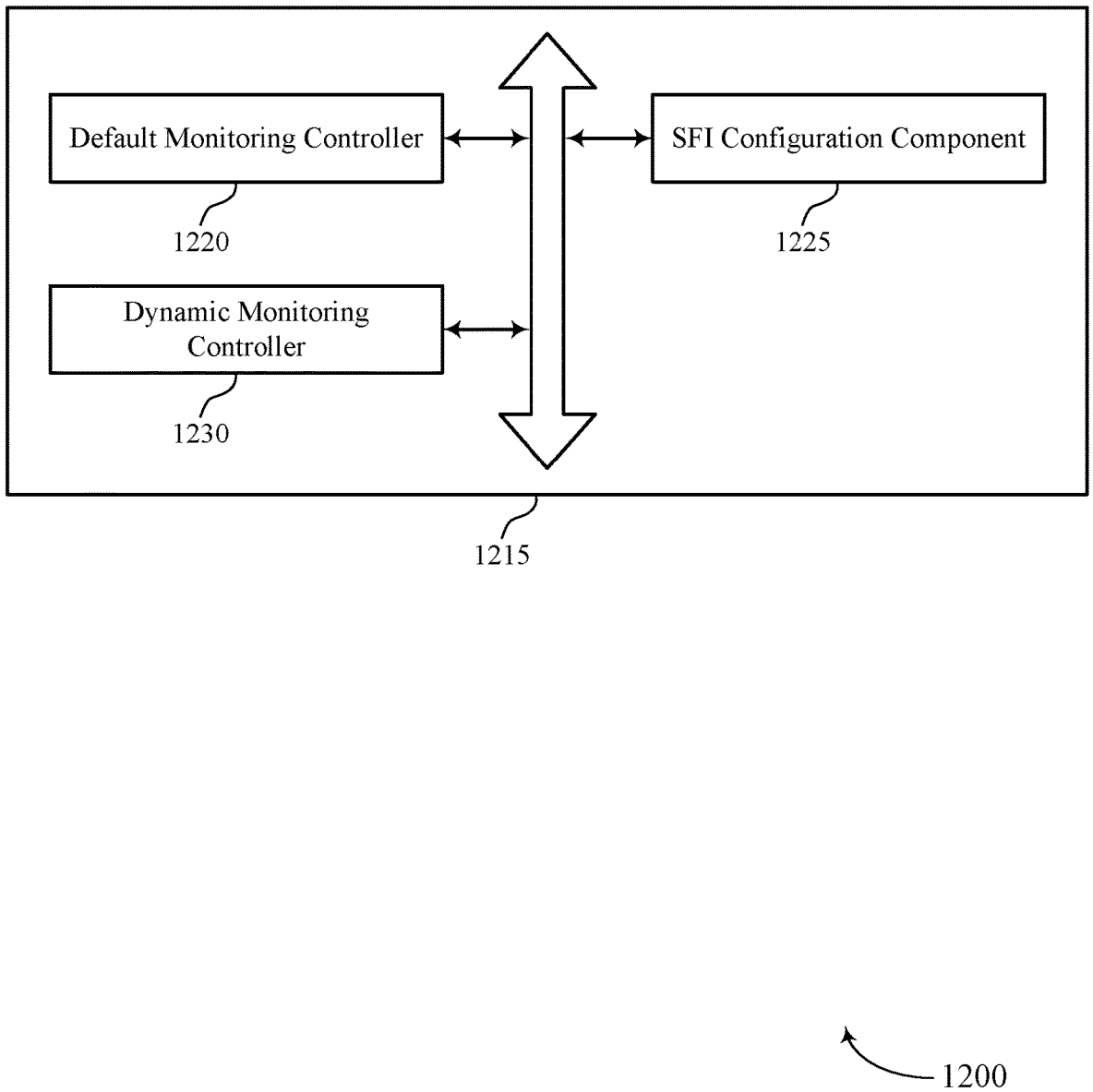

FIG. 12 shows a block diagram 1200 of a base station monitoring periodicity manager 1215 that supports flexible monitoring periodicity in accordance with aspects of the present disclosure. The base station monitoring periodicity manager 1215 may be an example of aspects of a base station monitoring periodicity manager 1315 described with reference to FIGS. 10, 11, and 13. The base station monitoring periodicity manager 1215 may include default monitoring controller 1220, SFI configuration component 1225, and dynamic monitoring controller 1230. Each of these modules may communicate, directly or indirectly, with one another (e.g., via one or more buses).

Default monitoring controller 1220 may transmit control signaling indicating a default monitoring periodicity for monitoring a control channel. In some cases, the control signaling includes cell-specific RRC signaling or UE specific RRC signaling. In some cases, the control channel includes a GC PDCCH.

SFI configuration component 1225 may configure a SFI that indicates a transmission format for one or more slots. In some cases, the SFI indicates whether symbols for the one or more slots are configured for uplink communications, downlink communications, or are reserved.

Dynamic monitoring controller 1230 may identify a dynamic monitoring periodicity for monitoring the control channel for the SFI. In some cases, the dynamic monitoring periodicity is less than or greater than the default monitoring periodicity. In some cases, the dynamic monitoring periodicity is equal to the default monitoring periodicity and a monitoring occasion for the SFI associated with the dynamic monitoring periodicity is different from a monitoring occasion for the SFI associated with the default monitoring periodicity. In some cases, the indication of the dynamic monitoring periodicity is transmitted in the SFI.

Figure 13:
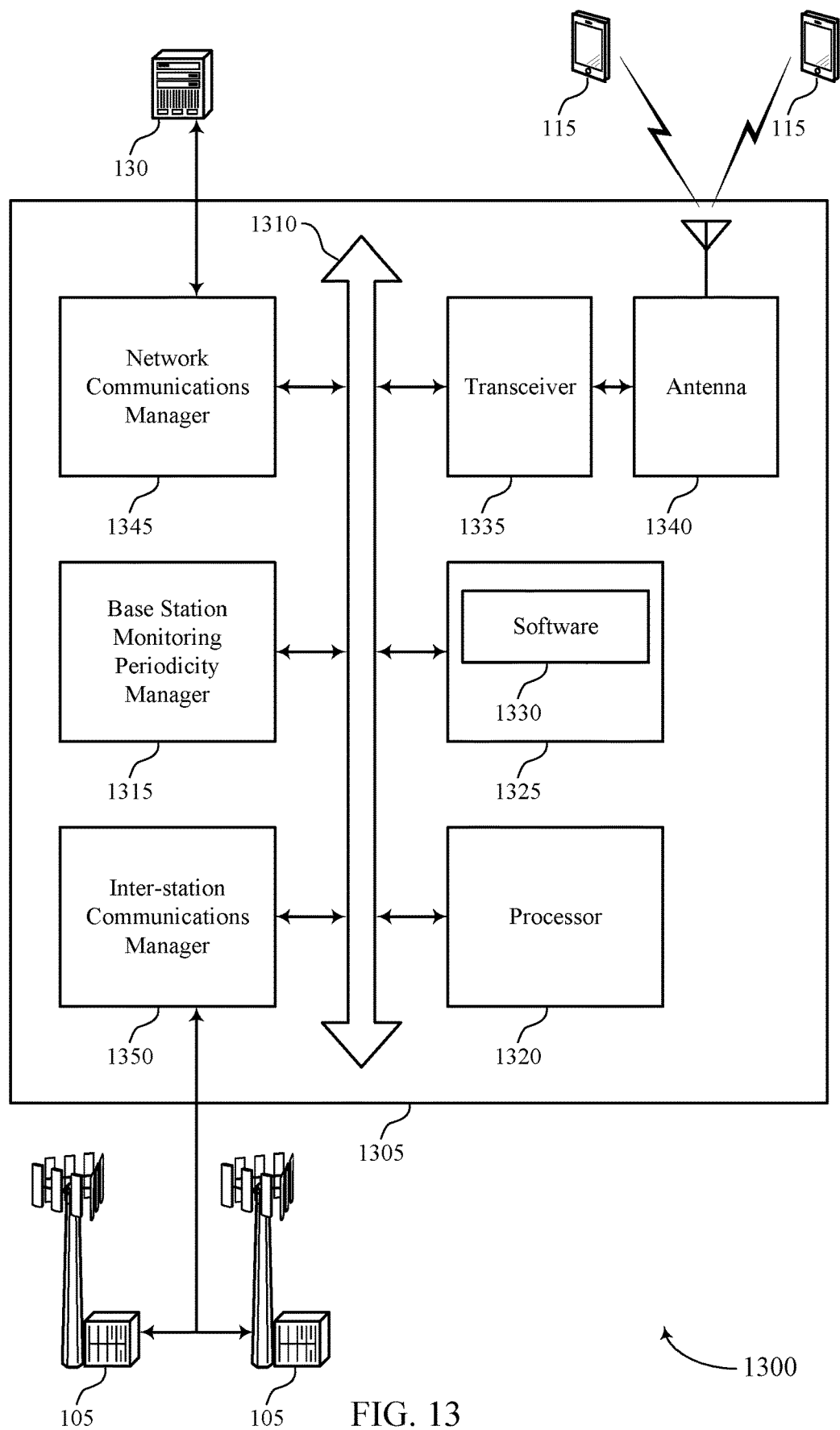
FIG. 13 illustrates a block diagram of a system including a base station that supports flexible monitoring periodicity in accordance with aspects of the present disclosure.

FIG. 13 shows a diagram of a system 1300 including a device 1305 that supports flexible monitoring periodicity in accordance with aspects of the present disclosure. Device 1305 may be an example of or include the components of base station 105 as described herein, e.g., with reference to FIG. 1. Device 1305 may include components for bi-directional voice and data communications including components for transmitting and receiving communications, including base station monitoring periodicity manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting flexible monitoring periodicity).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support flexible monitoring periodicity. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described herein. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
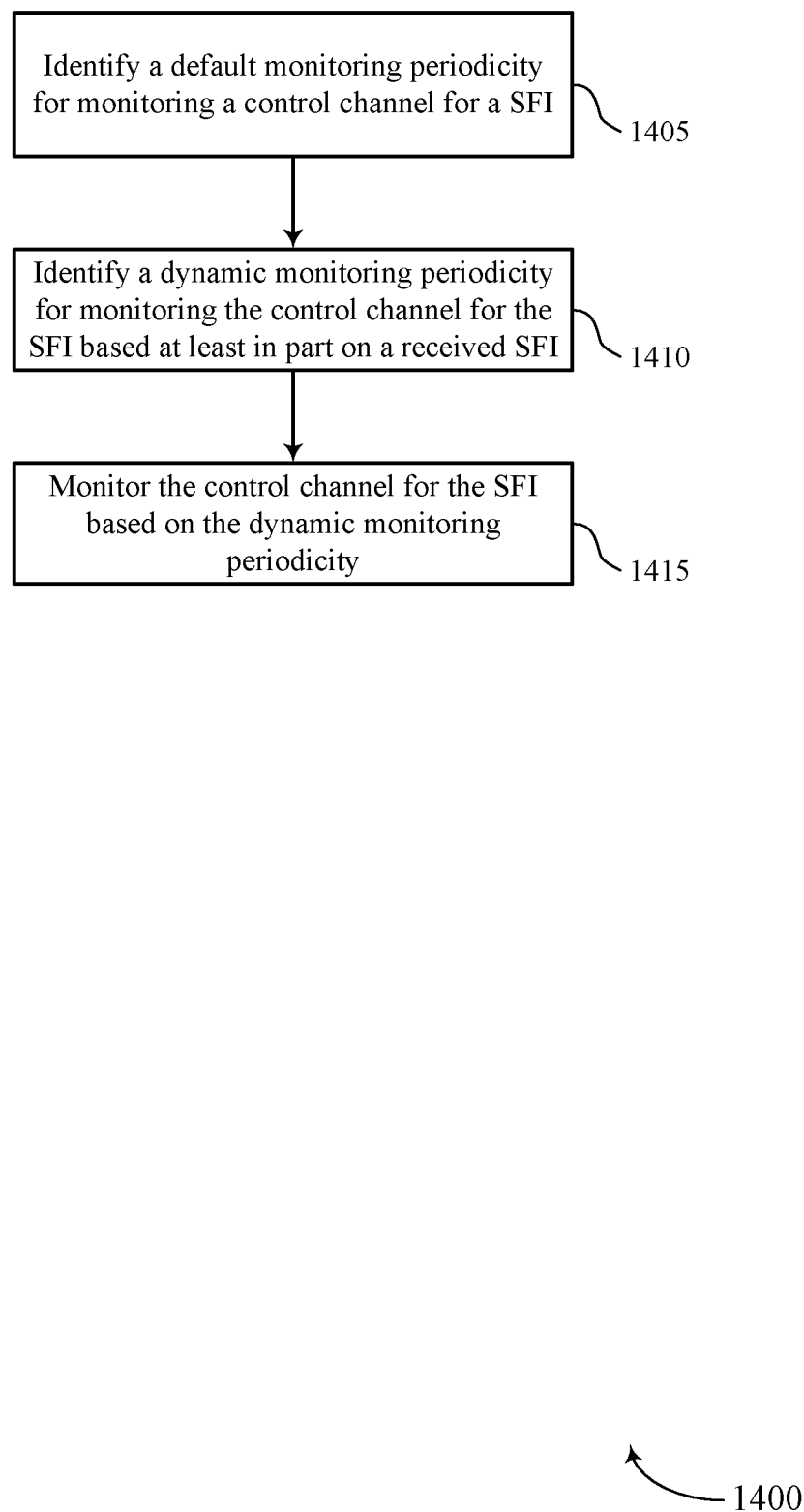
FIGS. 14 through 18 illustrate methods for flexible monitoring periodicity in accordance with aspects of the present disclosure.

FIG. 14 shows a flowchart illustrating a method 1400 for flexible monitoring periodicity in accordance with aspects of the present disclosure. The operations of method 1400 may be implemented by a UE 115 or its components as described herein. For example, the operations of method 1400 may be performed by a UE monitoring periodicity manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1405 the UE 115 may identify a default monitoring periodicity for monitoring a control channel for a SFI. The operations of 1405 may be performed according to the methods described herein. In certain examples, aspects of the operations of 1405 may be performed by a default monitoring controller as described with reference to FIGS. 6 through 9.

At 1410 the UE 115 may identify a dynamic monitoring periodicity for monitoring the control channel for the SFI based at least in part on a received SFI. The operations of 1410 may be performed according to the methods described herein. In certain examples, aspects of the operations of 1410 may be performed by a monitoring configuration selector as described with reference to FIGS. 6 through 9.

At 1415 the UE 115 may monitor the control channel for the SFI based at least in part on the dynamic monitoring periodicity. The operations of 1415 may be performed according to the methods described herein. In certain examples, aspects of the operations of 1415 may be performed by a dynamic monitoring controller as described with reference to FIGS. 6 through 9.

Figure 15:
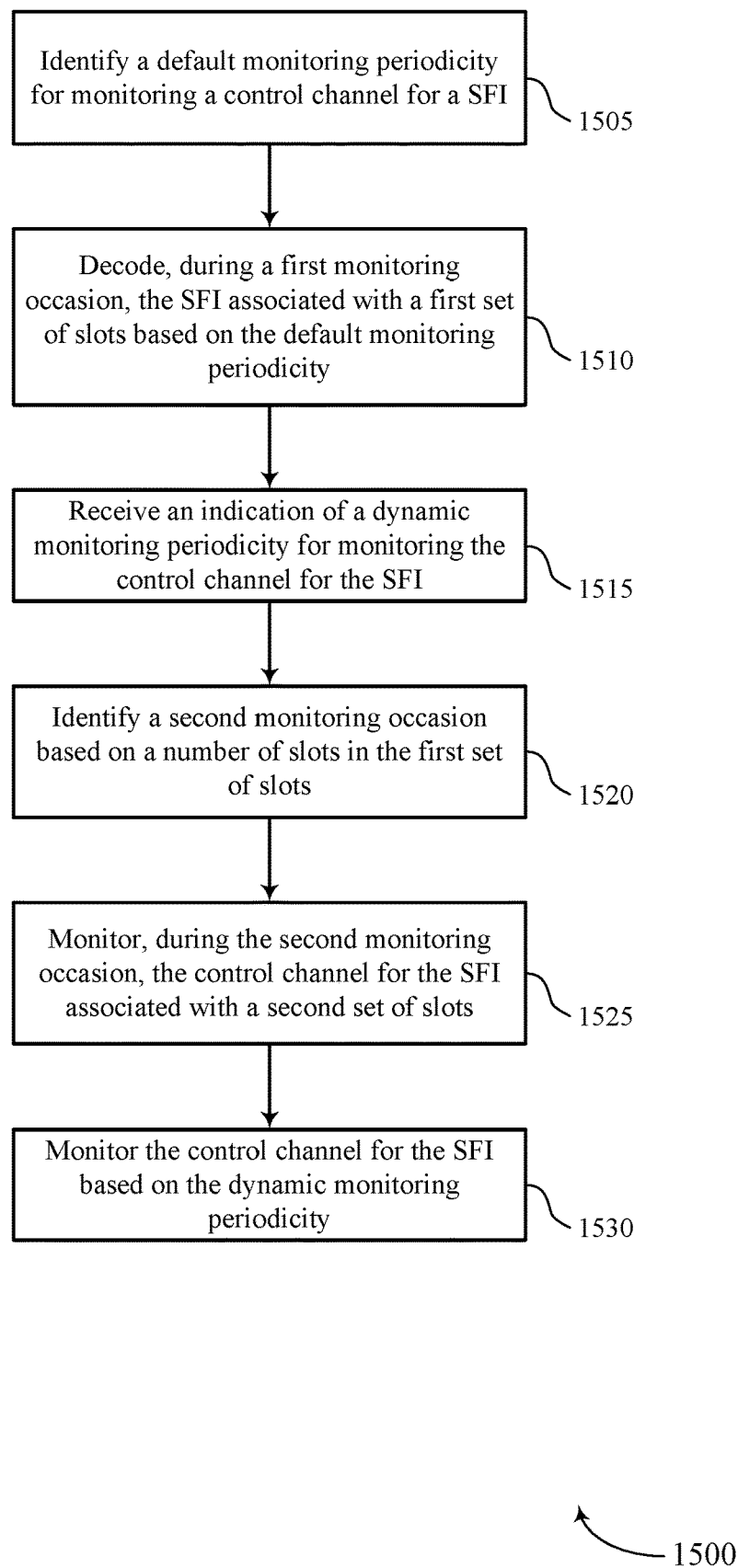

FIG. 15 shows a flowchart illustrating a method 1500 for flexible monitoring periodicity in accordance with aspects of the present disclosure. The operations of method 1500 may be implemented by a UE 115 or its components as described herein. For example, the operations of method 1500 may be performed by a UE monitoring periodicity manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1505 the UE 115 may identify a default monitoring periodicity for monitoring a control channel for a SFI. The operations of 1505 may be performed according to the methods described herein. In certain examples, aspects of the operations of 1505 may be performed by a default monitoring controller as described with reference to FIGS. 6 through 9.

At 1510 the UE 115 may decode, during a first monitoring occasion, the SFI associated with a first set of slots based at least in part on the default monitoring periodicity. The operations of 1510 may be performed according to the methods described herein. In certain examples, aspects of the operations of 1510 may be performed by a SFI decoder as described with reference to FIGS. 6 through 9.

At 1515 the UE 115 may receive an indication of a dynamic monitoring periodicity for monitoring the control channel for the SFI. For example, the dynamic monitoring periodicity indication may be received based on decoding the SFI at 1610. The operations of 1515 may be performed according to the methods described herein. In certain examples, aspects of the operations of 1515 may be performed by a monitoring configuration selector as described with reference to FIGS. 6 through 9.

At 1520 the UE 115 may identify a second monitoring occasion based at least in part on a number of slots in the first set of slots. For example, the number of slots may correspond to the dynamic monitoring periodicity determined at 1615. The operations of 1520 may be performed according to the methods described herein. In certain examples, aspects of the operations of 1520 may be performed by a monitoring configuration selector as described with reference to FIGS. 6 through 9.

At 1525 the UE 115 may monitor, during the second monitoring occasion, the control channel for the SFI associated with a second set of slots. The operations of 1525 may be performed according to the methods described herein. In certain examples, aspects of the operations of 1525 may be performed by a dynamic monitoring controller as described with reference to FIGS. 6 through 9.

At 1530 the UE 115 may continue to monitor the control channel for the SFI based at least in part on the dynamic monitoring periodicity. The operations of 1530 may be performed according to the methods described herein. In certain examples, aspects of the operations of 1530 may be performed by a dynamic monitoring controller as described with reference to FIGS. 6 through 9.

Figure 16:
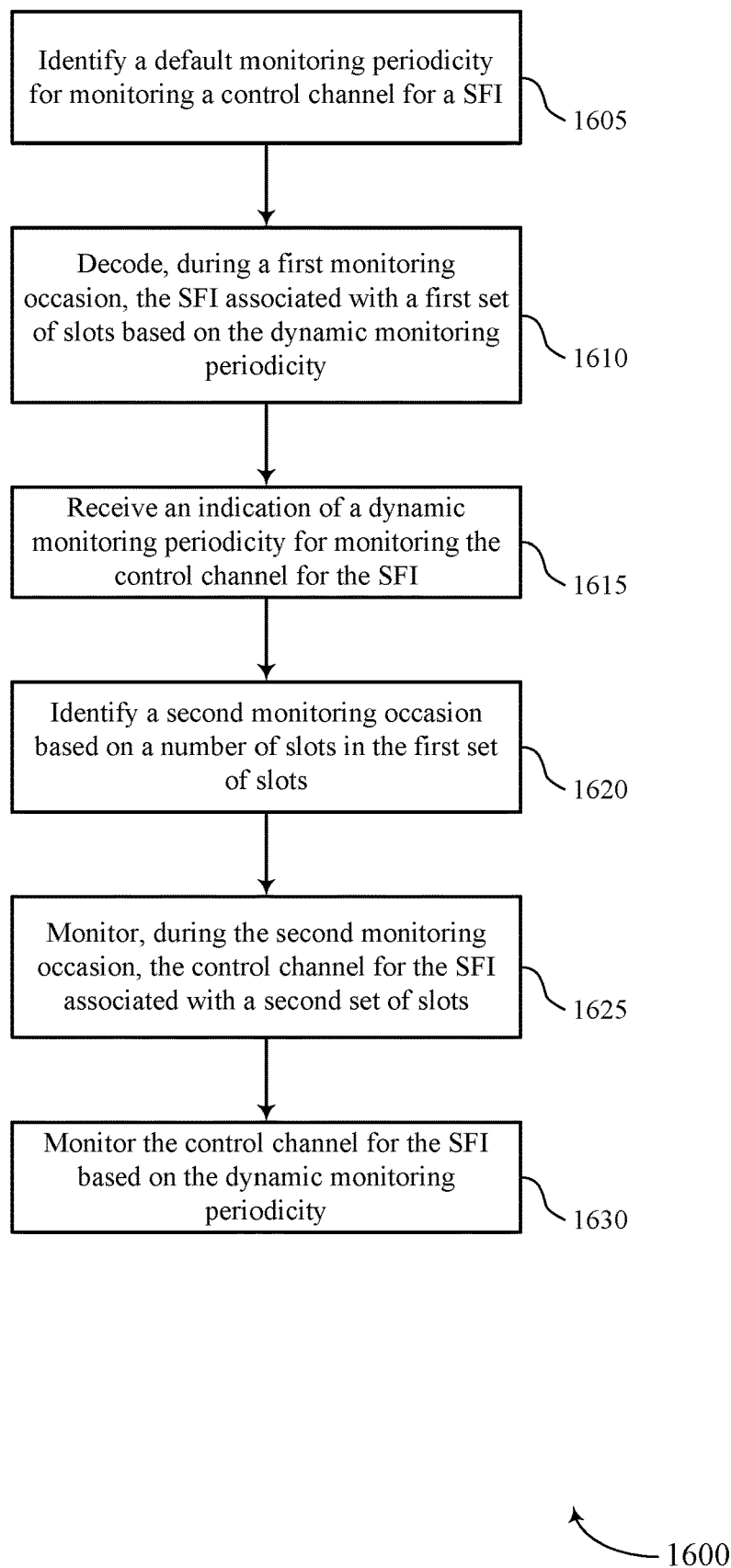

FIG. 16 shows a flowchart illustrating a method 1600 for flexible monitoring periodicity in accordance with aspects of the present disclosure. The operations of method 1600 may be implemented by a UE 115 or its components as described herein. For example, the operations of method 1600 may be performed by a UE monitoring periodicity manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1605 the UE 115 may identify a default monitoring periodicity for monitoring a control channel for a SFI. The operations of 1605 may be performed according to the methods described herein. In certain examples, aspects of the operations of 1605 may be performed by a default monitoring controller as described with reference to FIGS. 6 through 9.

At 1610 the UE 115 may decode, during a first monitoring occasion, the SFI associated with a first set of slots based at least in part on the dynamic monitoring periodicity (e.g., as opposed to monitoring based on the default monitoring periodicity as described with reference to FIG. 15). The operations of 1610 may be performed according to the methods described herein. In certain examples, aspects of the operations of 1610 may be performed by a SFI decoder as described with reference to FIGS. 6 through 9.

At 1615 the UE 115 may receive an indication of a dynamic monitoring periodicity for monitoring the control channel for the SFI. The operations of 1615 may be performed according to the methods described herein. In certain examples, aspects of the operations of 1615 may be performed by a monitoring configuration selector as described with reference to FIGS. 6 through 9.

At 1620 the UE 115 may identify a second monitoring occasion based at least in part on a number of slots in the first set of slots. The operations of 1620 may be performed according to the methods described herein. In certain examples, aspects of the operations of 1620 may be performed by a monitoring configuration selector as described with reference to FIGS. 6 through 9.

At 1625 the UE 115 may monitor, during the second monitoring occasion, the control channel for the SFI associated with a second set of slots. The operations of 1625 may be performed according to the methods described herein. In certain examples, aspects of the operations of 1625 may be performed by a dynamic monitoring controller as described with reference to FIGS. 6 through 9.

At 1630 the UE 115 may monitor the control channel for the SFI based at least in part on the dynamic monitoring periodicity. The operations of 1630 may be performed according to the methods described herein. In certain examples, aspects of the operations of 1630 may be performed by a dynamic monitoring controller as described with reference to FIGS. 6 through 9.

Figure 17:
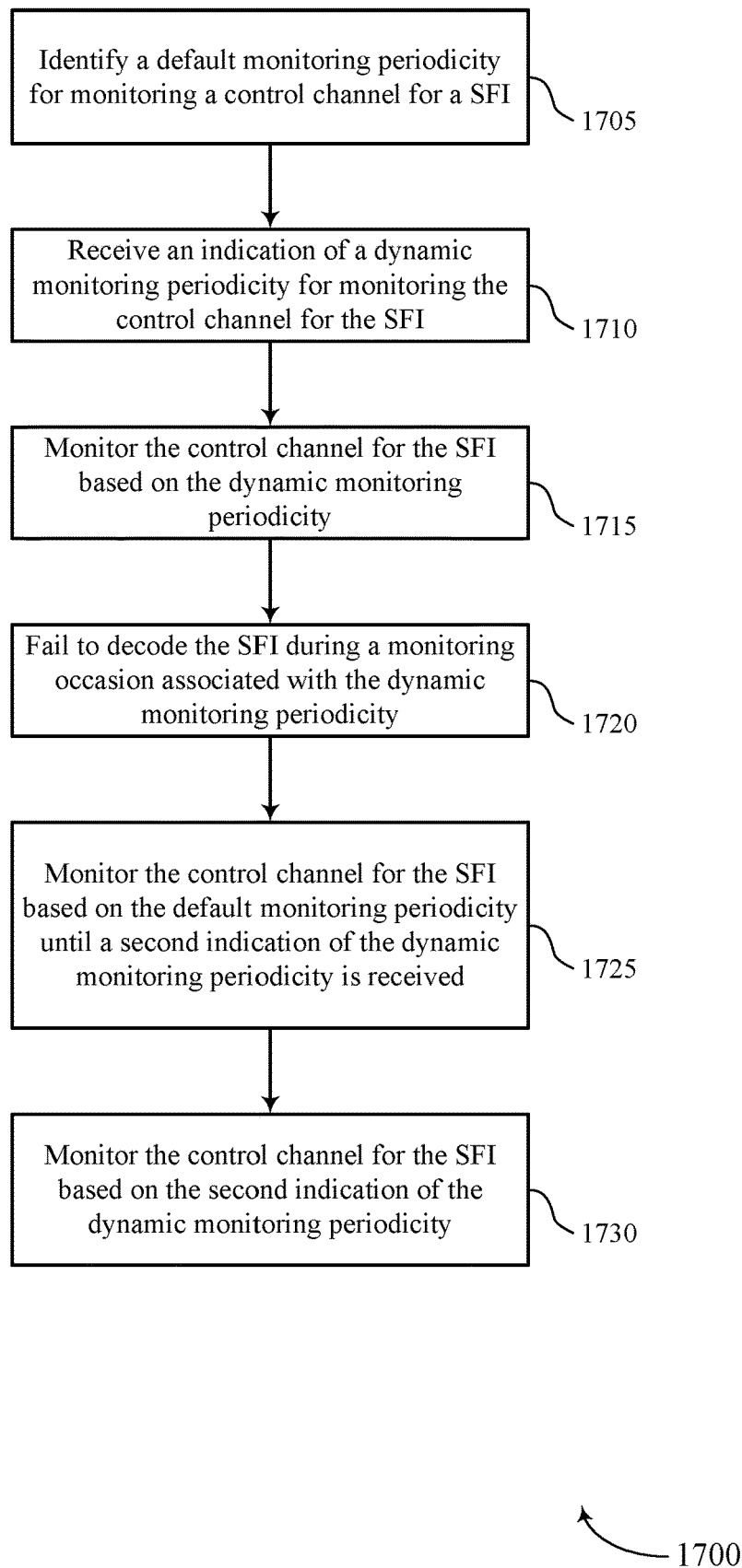

FIG. 17 shows a flowchart illustrating a method 1700 for flexible monitoring periodicity in accordance with aspects of the present disclosure. The operations of method 1700 may be implemented by a UE 115 or its components as described herein. For example, the operations of method 1700 may be performed by a UE monitoring periodicity manager as described with reference to FIGS. 6 through 9. In some examples, a UE 115 may execute a set of codes to control the functional elements of the device to perform the functions described herein Additionally or alternatively, the UE 115 may perform aspects of the functions described herein using special-purpose hardware.

At 1705 the UE 115 may identify a default monitoring periodicity for monitoring a control channel for a SFI. The operations of 1705 may be performed according to the methods described herein. In certain examples, aspects of the operations of 1705 may be performed by a default monitoring controller as described with reference to FIGS. 6 through 9.

At 1710 the UE 115 may receive an indication of a dynamic monitoring periodicity for monitoring the control channel for the SFI. The operations of 1710 may be performed according to the methods described herein. In certain examples, aspects of the operations of 1710 may be performed by a monitoring configuration selector as described with reference to FIGS. 6 through 9.

At 1715 the UE 115 may monitor the control channel for the SFI based at least in part on the dynamic monitoring periodicity. The operations of 1715 may be performed according to the methods described herein. In certain examples, aspects of the operations of 1715 may be performed by a dynamic monitoring controller as described with reference to FIGS. 6 through 9.

At 1720 the UE 115 may fail to decode the SFI during a monitoring occasion associated with the dynamic monitoring periodicity. The operations of 1720 may be performed according to the methods described herein. In certain examples, aspects of the operations of 1720 may be performed by a SFI decoder as described with reference to FIGS. 6 through 9.

At 1725 the UE 115 may monitor the control channel for the SFI based at least in part on the default monitoring periodicity until a second dynamic monitoring periodicity is received. The operations of 1725 may be performed according to the methods described herein. In certain examples, aspects of the operations of 1725 may be performed by a default monitoring controller as described with reference to FIGS. 6 through 9.

At 1730 the UE 115 may monitor the control channel for the SFI based at least in part on the second dynamic monitoring periodicity. The operations of 1730 may be performed according to the methods described herein. In certain examples, aspects of the operations of 1730 may be performed by a dynamic monitoring controller as described with reference to FIGS. 6 through 9.

Figure 18:
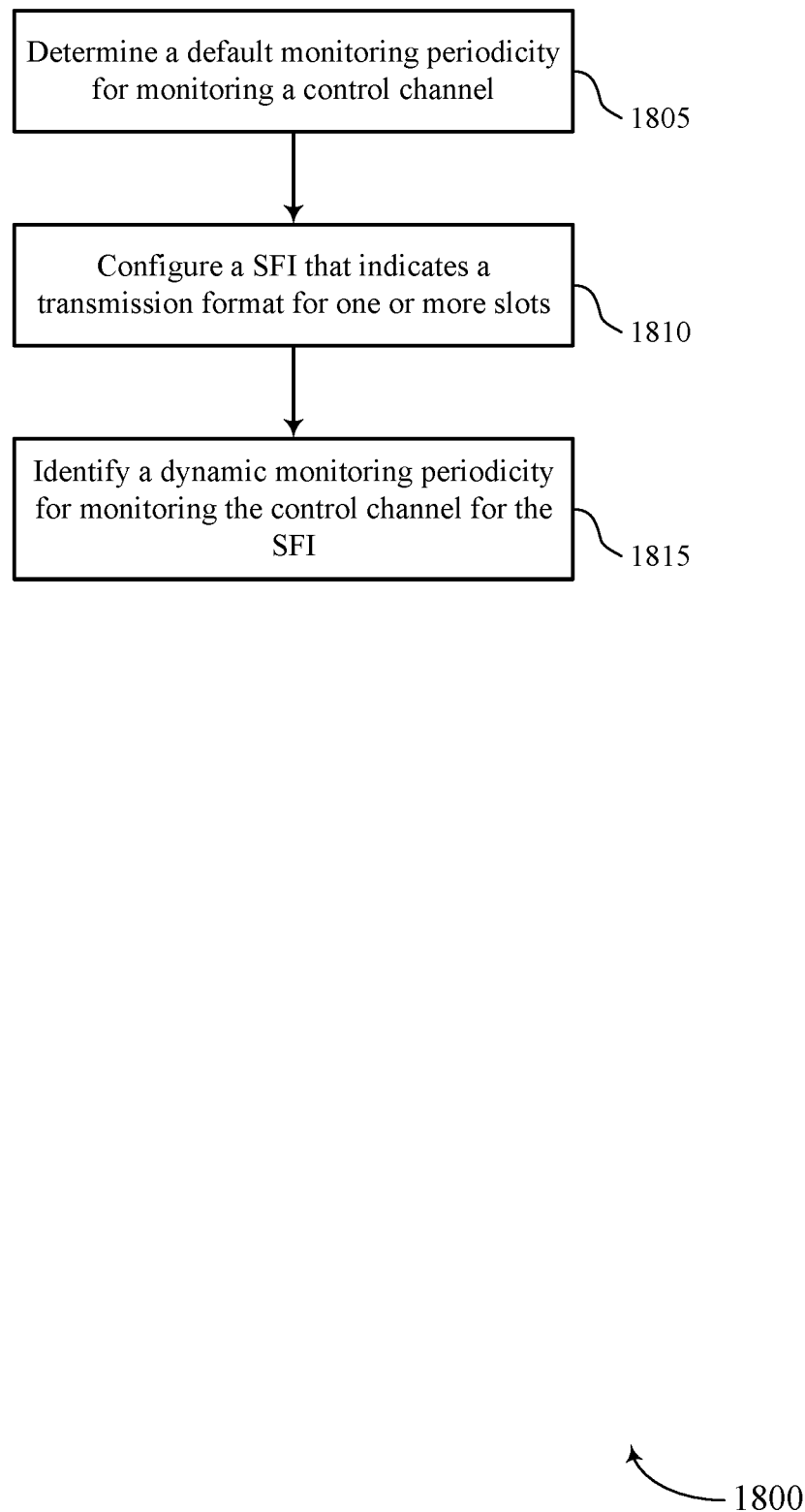

FIG. 18 shows a flowchart illustrating a method 1800 for flexible monitoring periodicity in accordance with aspects of the present disclosure. The operations of method 1800 may be implemented by a base station 105 or its components as described herein. For example, the operations of method 1800 may be performed by a base station monitoring periodicity manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1805 the base station 105 may determine a default monitoring periodicity for monitoring a control channel. The operations of 1805 may be performed according to the methods described herein. In certain examples, aspects of the operations of 1805 may be performed by a default monitoring controller as described with reference to FIGS. 10 through 13.

At 1810 the base station 105 may configure a SFI that indicates a transmission format for one or more slots. The operations of 1810 may be performed according to the methods described herein. In certain examples, aspects of the operations of 1810 may be performed by a SFI configuration component as described with reference to FIGS. 10 through 13.

At 1815 the base station 105 may identify a dynamic monitoring periodicity for monitoring the control channel for the SFI. The operations of 1815 may be performed according to the methods described herein. In certain examples, aspects of the operations of 1815 may be performed by a dynamic monitoring controller as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a default monitoring periodicity for monitoring a control channel for a slot format indicator (SFI);
identifying a dynamic monitoring periodicity that is different than the default monitoring periodicity, the dynamic monitoring periodicity for monitoring the control channel for the SFI based at least in part on a received SFI; and
monitoring the control channel for the SFI based at least in part on the dynamic monitoring periodicity.

2. The method of claim 1, further comprising:
decoding, during a first monitoring occasion, the SFI associated with a first set of slots based at least in part on the default monitoring periodicity;
identifying a second monitoring occasion based at least in part on a number of slots in the first set of slots; and
monitoring, during the second monitoring occasion, the control channel for the SFI associated with a second set of slots.

3. The method of claim 2, wherein the second set of slots comprises a next slot following the first set of slots.

4. The method of claim 2, wherein the first set of slots, or the second set of slots, or both consist of a single slot.

5. The method of claim 1, further comprising:
decoding, during a first monitoring occasion, the SFI associated with a first set of slots based at least in part on the dynamic monitoring periodicity;
identifying a second monitoring occasion based at least in part on a number of slots in the first set of slots; and
monitoring, during the second monitoring occasion, the control channel for the SFI associated with a second set of slots.

6. The method of claim 1, further comprising:
refraining from monitoring the control channel during monitoring occasions not associated with the dynamic monitoring periodicity.

7. The method of claim 1, further comprising:
cancelling one or more monitoring occasions associated with the default monitoring periodicity.

8. The method of claim 1, further comprising:
failing to decode the SFI during a monitoring occasion associated with the dynamic monitoring periodicity; and
monitoring the control channel in each slot subsequent to the monitoring occasion until a monitoring occasion associated with the default monitoring periodicity is reached.

9. The method of claim 8, further comprising:
identifying a second dynamic monitoring periodicity during the monitoring occasion associated with the default monitoring periodicity based at least in part on a second received SFI; and
monitoring the control channel for the SFI based at least in part on the second dynamic monitoring periodicity.

10. The method of claim 1, further comprising:
failing to decode the SFI during a monitoring occasion associated with the dynamic monitoring periodicity;
monitoring the control channel for the SFI based at least in part on the default monitoring periodicity until a second SFI indicating the dynamic monitoring periodicity is received; and
monitoring the control channel for the SFI based at least in part on the second received SFI indicating the dynamic monitoring periodicity.

11. The method of claim 1, further comprising:
receiving control signaling that indicates the default monitoring periodicity.

12. The method of claim 11, wherein the control signaling comprises cell-specific radio resource control (RRC) signaling or user equipment (UE) specific RRC signaling.

13. The method of claim 1, further comprising:
identifying a plurality of monitoring occasions based at least in part on the default monitoring periodicity.

14. The method of claim 1, wherein the SFI indicates whether symbols for one or more slots are configured for uplink communications, downlink communications, or are reserved.

15. The method of claim 1, wherein the dynamic monitoring periodicity is less than or greater than the default monitoring periodicity.

16. The method of claim 1, wherein the dynamic monitoring periodicity is equal to the default monitoring periodicity and a monitoring occasion for the SFI associated with the dynamic monitoring periodicity is different from a monitoring occasion for the SFI associated with the default monitoring periodicity.

17. The method of claim 1, wherein the control channel comprises a group common physical downlink control channel (GC PDCCH).

18. The method of claim 1, wherein the identifying the dynamic monitoring periodicity comprises receiving an indication of the dynamic monitoring periodicity in the received SFI.

19. A method for wireless communication, comprising:
determining a default monitoring periodicity for monitoring a control channel;
configuring a slot format indicator (SFI) that indicates a transmission format for one or more slots; and
identifying a dynamic monitoring periodicity that is different than the default monitoring periodicity, the dynamic monitoring periodicity for monitoring the control channel for the SFI.

20. The method of claim 19, further comprising:
transmitting, based at least in part on the determining, control signaling indicating the default monitoring periodicity for monitoring the control channel, the control signaling comprising at least one of cell-specific radio resource control (RRC) signaling or user equipment (UE) specific RRC signaling.

21. The method of claim 19, wherein the SFI indicates whether symbols for the one or more slots are configured for uplink communications, downlink communications, or are reserved.

22. The method of claim 19, wherein the dynamic monitoring periodicity is less than or greater than the default monitoring periodicity.

23. The method of claim 19, wherein the dynamic monitoring periodicity is equal to the default monitoring periodicity and a monitoring occasion for the SFI associated with the dynamic monitoring periodicity is different from a monitoring occasion for the SFI associated with the default monitoring periodicity.

24. The method of claim 19, wherein the control channel comprises a group common physical downlink control channel (GC PDCCH).

25. The method of claim 19, further comprising:
transmitting, in the SFI, an indication of the dynamic monitoring periodicity for monitoring the control channel for the SFI.

26. An apparatus for wireless communication, comprising:
a processor;
memory in electronic communication with the processor;
a receiver; and
instructions stored in the memory and executable by the processor to cause the apparatus to:
identify a default monitoring periodicity for monitoring a control channel for a slot format indicator (SFI);
identify, via the receiver, a dynamic monitoring periodicity that is different than the default monitoring periodicity, the dynamic monitoring periodicity for monitoring the control channel for the SFI based at least in part on a received SFI; and
monitor the control channel for the SFI based at least in part on the dynamic monitoring periodicity.

27. The apparatus of claim 26, wherein the instructions are further executable by the processor to cause the apparatus to:
decode, during a first monitoring occasion, the SFI associated with a first set of slots based at least in part on the default monitoring periodicity;
identify a second monitoring occasion based at least in part on a number of slots in the first set of slots; and
monitor, during the second monitoring occasion, the control channel for the SFI associated with a second set of slots.

28. The apparatus of claim 27, wherein the second set of slots comprises a next slot following the first set of slots.

29. The apparatus of claim 27, wherein the first set of slots, or the second set of slots, or both consist of a single slot.

30. The apparatus of claim 26, wherein the instructions are further executable by the processor to cause the apparatus to:
decode, during a first monitoring occasion, the SFI associated with a first set of slots based at least in part on the dynamic monitoring periodicity;
identify a second monitoring occasion based at least in part on a number of slots in the first set of slots; and
monitor, during the second monitoring occasion, the control channel for the SFI associated with a second set of slots.

31. The apparatus of claim 26, wherein the instructions are further executable by the processor to cause the apparatus to:
refrain from monitoring the control channel during monitoring occasions not associated with the dynamic monitoring periodicity.

32. The apparatus of claim 26, wherein the instructions are further executable by the processor to cause the apparatus to:
cancel one or more monitoring occasions associated with the default monitoring periodicity.

33. The apparatus of claim 26, wherein the apparatus fails to decode the SFI during a monitoring occasion associated with the dynamic monitoring periodicity, the instructions further executable by the processor to cause the apparatus to:
monitor the control channel in each slot subsequent to the monitoring occasion until a monitoring occasion associated with the default monitoring periodicity is reached.

34. The apparatus of claim 33, wherein the instructions are further executable by the processor to cause the apparatus to:
identify a second dynamic monitoring periodicity during the monitoring occasion associated with the default monitoring periodicity based on a second received SFI; and
monitor the control channel for the SFI based at least in part on the second dynamic monitoring periodicity.

35. The apparatus of claim 26, wherein the apparatus fails to decode the SFI during a monitoring occasion associated with the dynamic monitoring periodicity, the instructions further executable by the processor to cause the apparatus to:
monitor the control channel for the SFI based at least in part on the default monitoring periodicity until a second SFI indicating the dynamic monitoring periodicity is received; and
monitor the control channel for the SFI based at least in part on the second received SFI indicating the dynamic monitoring periodicity.

36. The apparatus of claim 26, wherein the instructions are further executable by the processor to cause the apparatus to:
receive control signaling that indicates the default monitoring periodicity.

37. The apparatus of claim 36, wherein the control signaling comprises cell-specific radio resource control (RRC) signaling or user equipment (UE) specific RRC signaling.

38. The apparatus of claim 26, wherein the instructions are further executable by the processor to cause the apparatus to:
identify a plurality of monitoring occasions based at least in part on the default monitoring periodicity.

39. The apparatus of claim 26, wherein the SFI indicates whether symbols for one or more slots are configured for uplink communications, downlink communications, or are reserved.

40. The apparatus of claim 26, wherein the dynamic monitoring periodicity is less than or greater than the default monitoring periodicity.

41. The apparatus of claim 26, wherein the dynamic monitoring periodicity is equal to the default monitoring periodicity and a monitoring occasion for the SFI associated with the dynamic monitoring periodicity is different from a monitoring occasion for the SFI associated with the default monitoring periodicity.

42. The apparatus of claim 26, wherein the control channel comprises a group common physical downlink control channel (GC PDCCH).

43. The apparatus of claim 26, wherein the identifying the dynamic monitoring periodicity comprises receiving an indication of the dynamic monitoring periodicity in the received SFI.

44. An apparatus for wireless communication, comprising:
a processor;
memory in electronic communication with the processor; and
instructions stored in the memory and executable by the processor to cause the apparatus to:
determine a default monitoring periodicity for monitoring a control channel;
configure a slot format indicator (SFI) that indicates a transmission format for one or more slots; and
identify a dynamic monitoring periodicity that is different than the default monitoring periodicity, the dynamic monitoring periodicity for monitoring the control channel for the SFI.

45. The apparatus of claim 44, wherein the instructions are further executable by the processor to:
transmit, based at least in part on the determining, control signaling indicating the default monitoring periodicity for monitoring the control channel, the control signaling comprising at least one of cell-specific radio resource control (RRC) signaling or user equipment (UE) specific RRC signaling.

46. The apparatus of claim 44, wherein the SFI indicates whether symbols for the one or more slots are configured for uplink communications, downlink communications, or are reserved.

47. The apparatus of claim 44, wherein the dynamic monitoring periodicity is less than or greater than the default monitoring periodicity.

48. The apparatus of claim 44, wherein the dynamic monitoring periodicity is equal to the default monitoring periodicity and a monitoring occasion for the SFI associated with the dynamic monitoring periodicity is different from a monitoring occasion for the SFI associated with the default monitoring periodicity.

49. The apparatus of claim 44, wherein the control channel comprises a group common physical downlink control channel (GC PDCCH).

50. The apparatus of claim 44, wherein the instructions are further executable by the processor to:
transmit, in the SFI, an indication of the dynamic monitoring periodicity for monitoring the control channel for the SFI.

51. An apparatus for wireless communication, comprising:
means for identifying a default monitoring periodicity for monitoring a control channel for a slot format indicator (SFI);
means for identifying a dynamic monitoring periodicity that is different than the default monitoring periodicity, the dynamic monitoring periodicity for monitoring the control channel for the SFI based at least in part on a received SFI; and
means for monitoring the control channel for the SFI based at least in part on the dynamic monitoring periodicity.

52. An apparatus for wireless communication, comprising:
means for determining a default monitoring periodicity for monitoring a control channel;
means for configuring a slot format indicator (SFI) that indicates a transmission format for one or more slots; and
means for identifying a dynamic monitoring periodicity that is different than the default monitoring periodicity, the dynamic monitoring periodicity for monitoring the control channel for the SFI.

53. A non-transitory computer-readable medium storing code for wireless communication, the code comprising instructions executable by a processor to:
identify a default monitoring periodicity for monitoring a control channel for a slot format indicator (SFI);
identify a dynamic monitoring periodicity that is different than the default monitoring periodicity, the dynamic monitoring periodicity for monitoring the control channel for the SFI based at least in part on a received SFI; and
monitor the control channel for the SFI based at least in part on the dynamic monitoring periodicity.

54. A non-transitory computer-readable medium storing code for wireless communication, the code comprising instructions executable by a processor to:
determine a default monitoring periodicity for monitoring a control channel;
configure a slot format indicator (SFI) that indicates a transmission format for one or more slots; and
identify a dynamic monitoring periodicity that is different than the default monitoring periodicity, the dynamic monitoring periodicity for monitoring the control channel for the SFI.

* * * * *